(12) United States Patent     (10) Patent No.:   US 12,559,680 B2

Baba     (45) Date of Patent:   Feb. 24, 2026

---

(54) LIQUID CRYSTAL COMPOSITION AND LIQUID CRYSTAL ELEMENT

(71) Applicant: KYUSHU NANOTEC OPTICS CO., LTD., Oita (JP)

(72) Inventor: Junichi Baba, Oita (JP)

(73) Assignee: KYUSHU NANOTEC OPTICS CO., LTD., Oita (JP)

( * ) Notice: Subject to any disclaimer, the term of this patent is extended or adjusted under 35 U.S.C. 154(b) by 69 days.

(21) Appl. No.: 18/565,088

(22) PCT Filed: Mar. 18, 2022

(86) PCT No.: PCT/JP2022/012887

§ 371 (c)(1),
(2) Date: Nov. 29, 2023

(87) PCT Pub. No.: WO2023/175978

PCT Pub. Date: Sep. 21, 2023

(65) Prior Publication Data

US 2024/0263076 A1     Aug. 8, 2024

(51) Int. Cl.
    *C09K 19/40*     (2006.01)
    *C09K 19/54*     (2006.01)
    *G02F 1/1334*     (2006.01)

(52) U.S. Cl.
    CPC ............... *C09K 19/40* (2013.01); *C09K 19/54* (2013.01); *G02F 1/1334* (2013.01); *C09K 2019/546* (2013.01)

(58) Field of Classification Search
    CPC ...................................................... C09K 19/40
    See application file for complete search history.

(56) References Cited

U.S. PATENT DOCUMENTS 5,476,611 A * 12/1995 Nolan .................. C09K 19/544
                                      252/299.61
2020/0241336 A1* 7/2020 Yamamoto ........ G02F 1/134363

FOREIGN PATENT DOCUMENTS

| CN | 111748358 | 10/2020 |
|----|-----------|---------|
| JP | H06504145 | 5/1994 |
| JP | H06208107 | 7/1994 |
| JP | H08500681 | 1/1996 |
| JP | H10330754 | 12/1998 |
| JP | 2005122190 | 5/2005 |

(Continued)

OTHER PUBLICATIONS

Kato; Kiyoshi, "UV curing system", General Technology Center, Feb. 1989, with partial English Translation thereof, pp. 1-8 (Year: 1989).*

(Continued)

*Primary Examiner* — Chanceity N Robinson
(74) *Attorney, Agent, or Firm* — JCIPRNET

(57) ABSTRACT

A liquid crystal composition contains a polymerizable organic compound and a liquid crystal compound. The liquid crystal compound has a solid phase-nematic phase transition temperature or smectic phase-nematic phase transition temperature of 0° C. or lower. The content of the polymerizable organic compound having a glass transition temperature of 0° C. or lower based on a total amount of the liquid crystal composition is 10 to 60 mass %. A liquid crystal element has a liquid crystal layer, and the liquid crystal layer contains such a liquid crystal composition.

5 Claims, 7 Drawing Sheets

(56) References Cited

FOREIGN PATENT DOCUMENTS

| JP | 2007092000 | 4/2007 |
|----|------------|--------|
| JP | 2010037411 | 2/2010 |
| JP | 2016020513 | 2/2016 |
| JP | 2019038919 | 3/2019 |
| JP | 2020164784 | 10/2020 |
| JP | 2021066875 | 4/2021 |
| KR | 20160102986 | 8/2016 |
| TW | 201920620 | 6/2019 |
| WO | 2014103039 | 7/2014 |
| WO | 2015151348 | 10/2015 |
| WO | 2017146217 | 8/2017 |
| WO | 2018221236 | 12/2018 |
| WO | 2019013003 | 1/2019 |
| WO | 2019021838 | 1/2019 |
| WO | 2019124345 | 6/2019 |

OTHER PUBLICATIONS

"International Search Report (Form PCT/ISA/210) of PCT/JP2022/012887", mailed on May 17, 2022, with English translation thereof, pp. 1-6.

"Office Action of Taiwan Counterpart Application", issued on Nov. 3, 2023, with English translation thereof, pp. 1-37.

Kato; Kiyoshi, "UV curing system", General Technology Center, Feb. 1989, with partial English translation thereof, pp. 1-8.

Osaka Organic Chemical Industry Ltd., "Cyclic trimethylolpropane formal acrylate", retrieved on Jul. 16, 2023, with partial English translation, Available at: https://www.ooc.co.jp/products/chemical/monofunctional/CTFA.

Kyoeisha Chemical Co., Ltd., "Light Acrylate L-A", retrieved on Jul. 16, 2023, with partial English translation, Available at: http://www.kyoeisha.co.jp/product/kinou/lightacrylate.php.

Negami Chemical Industrial Co., Ltd., "Features of urethane acrylate, Art Resin", retrieved on Jul. 12, 2023, with partial English translation, Available at: https://www.negamikogyo.co.jp/products/urethane-acrylate/.

Praveen Malik et al., "Textural, phase transition and electro-optic studies of polymerstabilized blue phase liquid crystals", Journal of Molecular Structure, Mar. 30, 2019, pp. 51-56, vol. 1188.

\* cited by examiner

LIQUID CRYSTAL COMPOSITION AND LIQUID CRYSTAL ELEMENT

CROSS-REFERENCE TO RELATED APPLICATION

This application is a 371 application of the International PCT application serial no. PCT/JP2022/012887, filed on Mar. 18, 2022. The entirety of each of the above-mentioned patent applications is hereby incorporated by reference herein and made a part of this specification.

TECHNICAL FIELD

The present invention relates to a liquid crystal composition and a liquid crystal element. Specifically, for example, the present invention relates to a liquid crystal composition used in a liquid crystal display and a liquid crystal element using the liquid crystal composition of the present invention.

BACKGROUND ART

Liquid crystal display devices, that is, liquid crystal displays, are used in various electronic devices such as smartphones, tablet terminals, laptop computers, digital cameras, smart watches, and operation panels of car navigation devices in automobiles.

However, liquid crystal displays have difficulty functioning smoothly in environments that are too hot or too cold.

The temperature at which liquid crystal compounds function most smoothly is 5° C. to about 50° C. The lower the temperature of the liquid crystal display, the longer the reaction time required for display, resulting in deterioration in the image quality and blurring.

Specifically, if the temperature of the liquid crystal display falls below 4° C., the liquid crystal display will malfunction.

For example, a drone is used to search for victims in extremely cold places such as snowy mountains in which the atmospheric temperature is well below 0° C., and a laptop computer is used to operate the drone. If the liquid crystal display of this laptop computer is cooled in an extremely cold environment, and the temperature of the liquid crystal display falls below 4° C., malfunction will occur, making it difficult for searchers to continue their search.

Therefore, various techniques have been proposed in order to enable a liquid crystal display to be cooled and driven at a low temperature.

For example, Patent Literature 1 proposes a technique for optimizing the surface temperature of a display panel by providing a transparent heater using an indium tin oxide (ITO) film on the display panel of a liquid crystal display device, and operating the heater when the temperature is low.

CITATION LIST

Patent Literature

Patent Literature 1

Japanese Patent Laid-Open No. 2005-122190

SUMMARY OF INVENTION

Technical Problem

However, in a method of providing a heater using an ITO film in a display panel of a liquid crystal display device, the ITO film needs to be processed in order to form the heater, and as a result, the process of processing the ITO film is added.

In addition, in order to obtain a more uniform display, it is necessary to consider the resistance distribution of the ITO film when a current is supplied to the ITO film in order to prevent the occurrence of unevenness in the current flowing within the plane of the ITO film.

Therefore, there has been a need for a liquid crystal element that can be driven even at 0° C. or lower without installing a member such as a heater and a liquid crystal composition which allows a liquid crystal element to be driven even at 0° C. or lower.

The present invention has been made in view of the above circumstances and an objective of the present invention is to provide a liquid crystal composition which allows a liquid crystal element to be driven at 0° C. or lower and a liquid crystal element that can be driven at 0° C. or lower.

Solution to Problem

In order to achieve the above objective, a liquid crystal composition of the present invention is a liquid crystal composition containing a polymerizable organic compound and a liquid crystal compound, wherein the liquid crystal compound has a solid phase-nematic phase transition temperature or smectic phase-nematic phase transition temperature of 0° C. or lower, and wherein the content of the organic compound having a glass transition temperature of 0° C. or lower based on a total amount of the liquid crystal composition is 10 to 60 mass %.

Here, when the liquid crystal compound has a solid phase-nematic phase transition temperature or smectic phase-nematic phase transition temperature of 0° C. or lower, the liquid crystal composition after polymerization can maintain flexibility even in a low temperature environment of 0° C. or lower and does not inhibit liquid crystal driving.

In addition, when the content of the polymerizable organic compound having a glass transition temperature of 0° ° C. or lower is 10 mass % or more, the glass transition temperature of the polymerized organic compound can also be lowered to 0° C. or lower, and even in a low temperature environment of 0° C. or lower, the liquid crystal composition can maintain flexibility.

In addition, when the content of the polymerizable organic compound having a glass transition temperature of 0° C. or lower is 60 mass % or less, it is easy to maintain dispersion properties of the liquid crystal composition and it is easy to prevent electric field responsiveness from being inhibited.

In addition, in the liquid crystal composition of the present invention, the organic compound may be at least one selected from the group consisting of monofunctional monomers, monofunctional oligomers, monofunctional polymers, bifunctional monomers, bifunctional oligomers, bifunctional polymers, multifunctional monomers, multifunctional oligomers and multifunctional polymers, and the content of the multifunctional monomers, the multifunctional oligomers or the multifunctional polymers based on a total amount of the liquid crystal composition may be 1 to 20 mass %.

In this case, when the content of multifunctional, that is, tri- or higher-functional monomer or oligomers or polymers, is 1 to 20 mass % based on a total amount of the liquid crystal composition, it becomes easier to construct a polymer network, it is possible to minimize an increase in the glass transition temperature of the liquid crystal composition, and it is possible to minimize a decrease in the responsiveness of the liquid crystal composition with respect to an electric field.

In addition, in the liquid crystal composition of the present invention, the organic compound may be at least one selected from the group consisting of bi- to tetrafunctional aliphatic urethane acrylate monomers, bi- to tetrafunctional aliphatic urethane acrylate oligomers, bi- to tetrafunctional aliphatic urethane acrylate polymers, bi- to tetrafunctional aliphatic oligomer acrylate monomers, bi- to tetrafunctional aliphatic oligomer acrylate oligomers, bi- to tetrafunctional aliphatic oligomer acrylate polymers, bi- to tetrafunctional polyester acrylate monomers, bi- to tetrafunctional polyester acrylate oligomers, bi- to tetrafunctional polyester acrylate polymers, mono- to hexafunctional (meth)acrylate ester monomers, mono- to hexafunctional (meth)acrylate ester oligomers, mono- to hexafunctional (meth)acrylate ester polymers, bi- to tetrafunctional thiol monomers, bi- to tetrafunctional thiol oligomers, bi- to tetrafunctional thiol polymers, monofunctional phosphate (meth)acrylate monomers, monofunctional phosphate (meth)acrylate oligomers and monofunctional phosphate (meth)acrylate polymers, and the content of the multifunctional monomers, multifunctional oligomers or multifunctional polymers based on a total amount of the liquid crystal composition may be 1 to 20 mass %.

In this case, bifunctional aliphatic urethane acrylates (monomers, oligomers or polymers), bifunctional aliphatic oligomer acrylates (monomers, oligomers or polymers), bifunctional polyester acrylates (monomers, oligomers or polymers), or bifunctional (meth)acrylate esters (monomers, oligomers or polymers) improve the adhesion of the liquid crystal composition and make it difficult to generate uncured components.

In addition, tri- to tetrafunctional aliphatic urethane acrylates (monomers, oligomers or polymers), tri- to tetrafunctional polyester acrylates (monomers, oligomers or polymers), or tri- to hexafunctional (meth)acrylate esters (monomers, oligomers or polymers) facilitate formation of a crosslinked structure in the liquid crystal composition.

In addition, since monofunctional (meth)acrylate esters (monomers, oligomers or polymers) have good compatibility with the liquid crystal compound in many liquid crystal compositions containing bi- or higher-functional monomers, they can be used to adjust the ratio between the liquid crystal compound and the organic compound.

In addition, bi- to tetrafunctional thiols (monomers, oligomers or polymers) can impart low shrinkage and deep curability (improved curability) to the liquid crystal composition, and can also impart further flexibility to the liquid crystal composition.

In addition, monofunctional phosphate (meth)acrylates (monomers, oligomers or polymers) allow the surface of the liquid crystal composition to be modified and can improve the adhesion to the base material interface.

In addition, tri- or higher-functional urethane acrylates (monomers, oligomers or polymers), mono- to hexafunctional (meth)acrylate esters (monomers, oligomers or polymers), or tri- or higher-functional thiols (monomers, oligomers or polymers) make the polymer network have a dense and complex structure, and the liquid crystal compound is randomly aligned along the polymer network, and thereby dispersion performance is improved.

In addition, when the content of multifunctional, that is, tri- or higher-functional monomer or oligomers or polymers, based on a total amount of the liquid crystal composition is 1 to 20 mass %, it becomes easier to construct a polymer network, it is possible to minimize an increase in the glass transition temperature of the liquid crystal composition, and it is possible to minimize a decrease in the responsiveness of the liquid crystal composition with respect to an electric field.

In addition, in the liquid crystal composition of the present invention, the content of monofunctional (meth) acrylate ester monomers, monofunctional (meth)acrylate ester oligomers or monofunctional (meth)acrylate ester polymers based on a total amount of the liquid crystal composition may be 10 to 40 mass %, the content of at least one organic compound selected from the group consisting of bifunctional (meth)acrylate ester monomers, bifunctional (meth)acrylate ester oligomers, bifunctional (meth)acrylate ester polymers, bifunctional aliphatic urethane acrylate monomers, bifunctional aliphatic urethane acrylate oligomers, bifunctional aliphatic urethane acrylate polymers, bifunctional aliphatic oligomer acrylate monomers, bifunctional aliphatic oligomer acrylate oligomers, bifunctional aliphatic oligomer acrylate polymers, bifunctional polyester acrylate monomers, bifunctional polyester acrylate oligomers and bifunctional polyester acrylate polymers based on a total amount of the liquid crystal composition may be 1 to 30 mass %, the content of the bi- to tetrafunctional thiol monomers, bi- to tetrafunctional thiol oligomers or bi- to tetrafunctional thiol polymers based on a total amount of the liquid crystal composition may be 1 to 10 mass %, the content of the monofunctional phosphate (meth)acrylate monomers, monofunctional phosphate (meth)acrylate oligomers or monofunctional phosphate (meth)acrylate polymers based on a total amount of the liquid crystal composition may be 0.1 to 3 mass %, and the content of at least one organic compound selected from the group consisting of tri- to tetrafunctional aliphatic urethane acrylate monomers, tri- to tetrafunctional aliphatic urethane acrylate oligomers, tri- to tetrafunctional aliphatic urethane acrylate polymers, tri- to tetrafunctional polyester acrylate monomers, tri- to tetrafunctional polyester acrylate oligomers, tri- to tetrafunctional polyester acrylate polymers, tri- to hexafunctional (meth)acrylate ester monomers, tri- to hexafunctional (meth) acrylate ester oligomers, and tri- to hexafunctional (meth) acrylate ester polymers based on a total amount of the liquid crystal composition may be 1 to 20 mass %.

When the content of monofunctional (meth)acrylate esters (monomers, oligomers or polymers) based on a total amount of the liquid crystal composition is 10 to 40 mass %, since the compatibility with the liquid crystal compound is good, it is possible to maintain the content of the liquid crystal compound at an appropriate value, it is possible to maintain the strength of the chemical bonds inside the liquid crystal composition, and it is easy to maintain the peel strength.

In addition, when the content of at least one organic compound selected from the group consisting of bifunctional (meth)acrylate esters (monomers, oligomers or polymers), bifunctional aliphatic urethane acrylates (monomers, oligomers or polymers), bifunctional aliphatic oligomer acrylates (monomers, oligomers or polymers), and bifunctional polyester acrylates (monomers, oligomers or polymers) based on a total amount of the liquid crystal composition is 1 to 30 mass %, the reaction between materials becomes unlikely to be interrupted, and uncured components are less likely to be generated.

In addition, when the content of bi- to tetrafunctional thiols (monomers, oligomers or polymers) based on a total amount of the liquid crystal composition is 1 to 10 mass %, it promotes formation of a uniform crystal domain structure, it is easy to improve shielding properties and transparency of the liquid crystal composition, and uncured components are unlikely to remain.

In addition, when the content of the monofunctional phosphate (meth)acrylates (monomers, oligomers or polymers) based on a total amount of the liquid crystal composition is 0.1 to 3 mass %, it is possible to improve the adhesion to the base material interface while minimizing an increase in current value when a current is applied to the liquid crystal composition.

In addition, when the content of at least one organic compound selected from among tri- to tetrafunctional aliphatic urethane acrylates (monomers, oligomers or polymers), tri- to tetrafunctional polyester acrylates (monomers, oligomers or polymers), and tri- to hexafunctional (meth) acrylate esters (monomers, oligomers or polymers) based on a total amount of the liquid crystal composition is 1 to 20 mass %, this facilitates formation of a crosslinked structure in the liquid crystal composition, it is possible to minimize high-voltage driving of the liquid crystal composition and it is possible to minimize deterioration in shielding properties and transparency of the liquid crystal composition.

In addition, in the liquid crystal composition of the present invention, the content of the liquid crystal compound based on a total amount of the liquid crystal composition may be 40 to 80 mass %.

In this case, it is easy to maintain better dispersion properties of the liquid crystal composition, it is easy to maintain electric field responsiveness, and it is also easy to maintain processability of the liquid crystal composition.

In addition, in the liquid crystal composition of the present invention, the content of the organic compound having a glass transition temperature of higher than 0° C. based on a total amount of the liquid crystal composition may be 1 to 40 mass %.

In this case, it imparts the rigidity to the polymer of the liquid crystal composition and it is easy to maintain a fine mesh structure of the polymer of the liquid crystal composition.

In addition, in order to achieve the above objective, the liquid crystal composition of the present invention is a liquid crystal composition containing a polymerizable organic compound and a liquid crystal compound, the liquid crystal compound has a solid phase-nematic phase transition temperature or smectic phase-nematic phase transition temperature of 0° C. or lower and the content of the organic compound having a glass transition temperature of 0° C. or lower based on a total amount of the liquid crystal composition is 10 mass % or more.

Here, when the liquid crystal compound has a solid phase-nematic phase transition temperature or smectic phase-nematic phase transition temperature of 0° C. or lower, the liquid crystal composition after polymerization can maintain flexibility even in a low temperature environment of 0° C. or lower and does not inhibit liquid crystal driving.

In addition, when the content of the polymerizable organic compound having a glass transition temperature of 0° C. or lower is 10 mass % or more, the glass transition temperature of the polymerized organic compound can also be lowered to 0° C. or lower, and even in a low temperature environment of 0° C. or lower, the liquid crystal composition can maintain flexibility.

In addition, in order to achieve the above objective, a liquid crystal element of the present invention includes a planar first base material, a first conductive film that is disposed on one side of the first base material and has conductivity, a liquid crystal layer that is disposed on the side of the first conductive film opposite to the first base material and contains a liquid crystal composition, a second conductive film that is disposed on the side of the liquid crystal layer opposite to the first conductive film and has conductivity, and a planar second base material that is disposed on the side of the second conductive film opposite to the liquid crystal layer, the liquid crystal composition contains a polymerizable organic compound and a liquid crystal compound, the liquid crystal compound has a solid phase-nematic phase transition temperature or smectic phase-nematic phase transition temperature of 0° C. or lower, and the content of the organic compound having a glass transition temperature of 0° C. or lower based on a total amount of the liquid crystal composition is 10 to 60 mass %.

Here, when the liquid crystal compound has a solid phase-nematic phase transition temperature or smectic phase-nematic phase transition temperature of 0° C. or lower, the liquid crystal composition after polymerization can maintain flexibility even in a low temperature environment of 0° C. or lower and does not inhibit liquid crystal driving.

In addition, when the content of the polymerizable organic compound having a glass transition temperature of 0° C. or lower is 10 mass % or more, the glass transition temperature of the polymerized organic compound can also be lowered to 0° C. or lower, and even in a low temperature environment of 0° C. or lower, the liquid crystal composition can maintain flexibility.

In addition, when the content of the polymerizable organic compound having a glass transition temperature of 0° C. or lower is 60 mass % or less, it is easy to maintain dispersion properties of the liquid crystal composition and it is easy to prevent electric field responsiveness from being inhibited.

Advantageous Effects of Invention

The liquid crystal composition according to the present invention allows the liquid crystal element to be driven at 0° C. or lower.

The liquid crystal element according to the present invention can be driven at 0° C. or lower.

DESCRIPTION OF EMBODIMENTS

Figure 1:
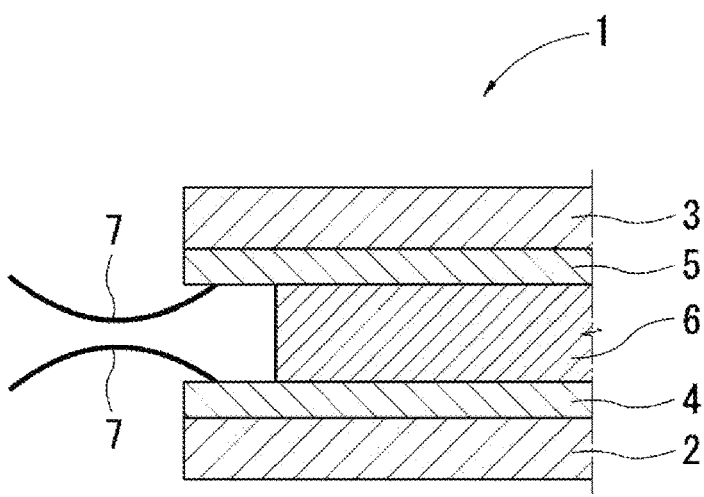
FIG. 1 is a schematic cross-sectional view showing an example of a liquid crystal element to which the present invention is applied.

A liquid crystal composition of the present invention contains a polymerizable organic compound and a liquid crystal compound.

Here, the liquid crystal composition of the present invention contains a predetermined amount of a polymerizable organic compound having a glass transition temperature of 0° C. or lower.

That is, the content of the polymerizable organic compound having a glass transition temperature of 0° C. or lower based on a total amount of the liquid crystal composition is 10 to 60 mass %, and preferably 20 to 60 mass %.

In addition, the liquid crystal composition of the present invention may contain a predetermined amount of a polymerizable organic compound having a glass transition temperature of higher than 0° C.

That is, specifically, the content of the polymerizable organic compound having a glass transition temperature of higher than 0° C. based on a total amount of the liquid crystal composition is, for example, 1 to 40 mass % and preferably 10 to 30 mass %.

In this manner, the polymerizable organic compound contained in the liquid crystal composition of the present invention include those having a glass transition temperature of 0° C. or lower and those having a glass transition temperature of higher than 0° C.

In addition, such organic compounds contained in the liquid crystal composition of the present invention are, specifically, for example, at least one selected from the group consisting of monofunctional monomers, monofunctional oligomers, monofunctional polymers, bifunctional monomers, bifunctional oligomers, bifunctional polymers, multifunctional monomers, multifunctional oligomers and multifunctional polymers.

In addition, more specifically, for example, the organic compound contained in the liquid crystal composition of the present invention is at least one selected from the group consisting of bi- to tetrafunctional aliphatic urethane acrylate monomers, bi- to tetrafunctional aliphatic urethane acrylate oligomers, bi- to tetrafunctional aliphatic urethane acrylate polymers, bi- to tetrafunctional aliphatic oligomer acrylate monomers, bi- to tetrafunctional aliphatic oligomer acrylate oligomers, bi- to tetrafunctional aliphatic oligomer acrylate polymers, bi- to tetrafunctional polyester acrylate monomers, bi- to tetrafunctional polyester acrylate oligomers, bi- to tetrafunctional polyester acrylate polymers, mono- to hexafunctional (meth)acrylate ester monomers, mono- to hexafunctional (meth)acrylate ester oligomers, mono- to hexafunctional (meth)acrylate ester polymers, bi- to tetrafunctional thiol monomers, bi- to tetrafunctional thiol oligomers, bi- to tetrafunctional thiol polymers, monofunctional phosphate (meth)acrylate monomers, monofunctional phosphate (meth)acrylate oligomers and monofunctional phosphate (meth)acrylate polymers.

In addition, specifically, the content of the multifunctional monomers, multifunctional oligomers or multifunctional polymers based on a total amount of the liquid crystal composition of the present invention is, for example, 1 to 20 mass %, preferably 1 to 10 mass %, and most preferably 1 to 5 mass %.

In addition, specifically, the content of the monofunctional (meth)acrylate ester monomers, monofunctional (meth)acrylate ester oligomers or monofunctional (meth)acrylate ester polymers based on a total amount of the liquid crystal composition of the present invention is, for example, is 10 to 40 mass %, preferably 20 to 40 mass %, and most preferably 20 to 30 mass %.

In addition, specifically, the content of at least one organic compound selected from the group consisting of bifunctional (meth)acrylate ester monomers, bifunctional (meth) acrylate ester oligomers, bifunctional (meth)acrylate ester polymers, bifunctional aliphatic urethane acrylate monomers, bifunctional aliphatic urethane acrylate oligomers, bifunctional aliphatic urethane acrylate polymers, bifunctional aliphatic oligomer acrylate monomers, bifunctional aliphatic oligomer acrylate oligomers, bifunctional aliphatic oligomer acrylate polymers, bifunctional polyester acrylate monomers, bifunctional polyester acrylate oligomers and bifunctional polyester acrylate polymers based on a total amount of the liquid crystal composition of the present invention is, for example, is 1 to 30 mass %, preferably 1 to 20 mass %, and most preferably 10 to 15 mass %.

In addition, specifically, the content of the bi- to tetrafunctional thiol monomers, bi- to tetrafunctional thiol oligomers or bi- to tetrafunctional thiol polymers based on a total amount of the liquid crystal composition of the present invention is, for example, 1 to 10 mass %, more preferably 1 to 5 mass %, and most preferably 1 to 3 mass %.

In addition, specifically, the content of the monofunctional phosphate (meth)acrylate monomers, monofunctional phosphate (meth)acrylate oligomers or monofunctional phosphate (meth)acrylate polymers based on a total amount of the liquid crystal composition of the present invention is, for example, 0.1 to 3 mass %.

In addition, specifically, the content of at least one organic compound selected from the group consisting of tri- to tetrafunctional aliphatic urethane acrylate monomers, tri- to tetrafunctional aliphatic urethane acrylate oligomers, tri- to tetrafunctional aliphatic urethane acrylate polymers, tri- to tetrafunctional polyester acrylate monomers, tri- to tetrafunctional polyester acrylate oligomers, tri- to tetrafunctional polyester acrylate polymers, tri- to hexafunctional (meth)acrylate ester monomers, tri- to hexafunctional (meth) acrylate ester oligomers, and tri- to hexafunctional (meth) acrylate ester polymers based on a total amount of the liquid crystal composition of the present invention is, for example, 1 to 20 mass %, preferably 1 to 10 mass %, and most preferably 1 to 3 mass %.

In addition, it is preferable to introduce a polymerization initiator that can initiate polymerization of the polymerizable organic compound into the liquid crystal composition of the present invention with ultraviolet rays.

Here, specifically, the content of the polymerization initiator based on a total amount of the liquid crystal composition of the present invention is, for example, 0.1 to 10 mass %, preferably 0.5 to 5.0 mass %, and most preferably 0.5 to 3.0 mass %.

Examples of such polymerization initiators include organic peracids such as tert-butylperoxy-iso-butarate, 2,5-dimethyl-2,5-bis(benzoyldioxy)hexane, 1,4-bis[α-(tert-butyldioxy)-iso-propoxy]benzene, di-tert-butyl peroxide, 2,5-dimethyl-2,5-bis(tert-butyldioxy)hexene hydroperoxide, α-(iso-propylphenyl)-iso-propyl hydroperoxide, 2,5-dimethylhexane, tert-butyl hydroperoxide, 1,1-bis(tert-butyldioxy)-3,3,5-trimethylcyclohexane, butyl-4,4-bis(tert-butyldioxy)valerate, cyclohexanone peroxide, 2,2',5,5'-tetra(tert-butylperoxycarbonyl)benzophenone, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3'-bis(tert-butylperoxycarbonyl)-4,4'-dicarboxybenzophenone, tert-butylperoxybenzoate, and di-tert-butyl diperoxyisophthalate, quinones such as 9,10-anthraquinone, 1-chloroanthraquinone, 2-chloroanthraquinone, octamethylanthraquinone, and 1,2-benzanthraquinone, and benzoin derivatives such as benzoin methyl, benzoin ethyl ether, α-methylbenzoin, and α-phenylbenzoin.

In addition, the liquid crystal compound contained in the liquid crystal composition of the present invention is at least one selected from among guest-host liquid crystal compounds, nematic liquid crystal compounds, smectic liquid crystal compounds, and cholesteric liquid crystal compounds.

In addition, specifically, the nematic phase-isotropic liquid phase transition temperature (Tni) of the liquid crystal compound contained in the liquid crystal composition of the present invention is, for example, 40° C. to 150° C., preferably 80° C. to 150° C., and optimally 130° C.

In addition, the solid phase-nematic phase transition temperature (Tcn) or the smectic phase-nematic phase transition temperature (Tsn) of the liquid crystal compound contained in the liquid crystal composition of the present invention is 0° C. or lower.

In addition, specifically, the solid phase-nematic phase transition temperature or the smectic phase-nematic phase transition temperature is, for example, 0° C. to −50° C., preferably −10° C. to −50° C., and most preferably −20° C. to −40° C.

In addition, specifically, the refractive index anisotropy (Δn) of the liquid crystal compound contained in the liquid crystal composition of the present invention is, for example, 0.01 to 0.50, preferably 0.1 to 0.4, and most preferably 0.1 to 0.3.

In addition, specifically, the dielectric anisotropy (Δε) of the liquid crystal compound contained in the liquid crystal composition of the present invention is, for example, 1 to 25, preferably 5 to 20, and most preferably 5 to 10.

In addition, specifically, the content of the liquid crystal compound based on a total amount of the liquid crystal composition of the present invention is, for example, 40 to 80 mass %.

In the liquid crystal composition of the present invention, the content of the organic compound having a glass transition temperature of 0° C. or lower based on a total amount of the liquid crystal composition of the present invention may not necessarily be 60 mass % or less.

However, such a configuration is preferable because it is easy to maintain dispersion properties of the liquid crystal composition and it is easy to prevent electric field responsiveness from being inhibited.

In the liquid crystal composition of the present invention, the content of the multifunctional monomers, multifunctional oligomers or multifunctional polymers based on a total amount of the liquid crystal composition may not necessarily be 1 to 20 mass %.

However, such a configuration is preferable because it becomes easier to construct a polymer network, it is possible to minimize an increase in the glass transition temperature of the liquid crystal composition, and it is possible to minimize a decrease in the responsiveness of the liquid crystal composition with respect to an electric field.

In addition, in the liquid crystal composition of the present invention, the organic compound does not necessarily have to be at least one selected from the group consisting of bi- to tetrafunctional aliphatic urethane acrylate monomers, bi- to tetrafunctional aliphatic urethane acrylate oligomers, bi- to tetrafunctional aliphatic urethane acrylate polymers, bi- to tetrafunctional aliphatic oligomer acrylate monomers, bi- to tetrafunctional aliphatic oligomer acrylate oligomers, bi- to tetrafunctional aliphatic oligomer acrylate polymers, bi- to tetrafunctional polyester acrylate monomers, bi- to tetrafunctional polyester acrylate oligomers, bi-to tetrafunctional polyester acrylate polymers, mono- to hexafunctional (meth)acrylate ester monomers, mono- to hexafunctional (meth)acrylate ester oligomers, mono- to hexafunctional (meth)acrylate ester polymers, bi- to tetrafunctional thiol monomers, bi- to tetrafunctional thiol oligomers, bi- to tetrafunctional thiol polymers, monofunctional phosphate (meth)acrylate monomers, monofunctional phosphate (meth)acrylate oligomers and monofunctional phosphate (meth)acrylate polymers.

However, such a configuration is preferable because it improves the adhesion of the liquid crystal composition and uncured components are less likely to be generated.

In addition, such a configuration is preferable because it facilitates formation of a crosslinked structure in the liquid crystal composition.

In addition, such a configuration is preferable because low shrinkage and deep curability (improved curability) can be imparted to the liquid crystal composition and further flexibility can be imparted to the liquid crystal composition.

In addition, such a configuration is preferable because the surface of the liquid crystal composition is modified and the adhesion to the base material interface can be improved.

In addition, such a configuration is preferable because the polymer network has a dense and complex structure, the liquid crystal compound is randomly aligned along the polymer network, and thereby dispersion performance is improved.

In addition, in the liquid crystal composition of the present invention, the content of monofunctional (meth) acrylate ester monomers, monofunctional (meth)acrylate ester oligomers or monofunctional (meth)acrylate ester polymers based on a total amount of the liquid crystal composition of the present invention may not necessarily be 10 to 40 mass %.

However, such a configuration is preferable because, since the compatibility with the liquid crystal compound is good, it is possible to maintain the content of the liquid crystal compound at an appropriate value, it is possible to maintain the strength of the chemical bond inside the liquid crystal composition, and it is easy to maintain the peel strength.

In addition, in the liquid crystal composition of the present invention, the content of at least one organic compound selected from the group consisting of bifunctional (meth)acrylate ester monomers, bifunctional (meth)acrylate ester oligomers, bifunctional (meth)acrylate ester polymers, bifunctional aliphatic urethane acrylate monomers, bifunctional aliphatic urethane acrylate oligomers, bifunctional aliphatic urethane acrylate polymers, bifunctional aliphatic oligomer acrylate monomers, bifunctional aliphatic oligomer acrylate oligomers, bifunctional aliphatic oligomer acrylate polymers, bifunctional polyester acrylate monomers, bifunctional polyester acrylate oligomers and bifunctional polyester acrylate polymers based on a total amount of the liquid crystal composition of the present invention may not necessarily be 1 to 30 mass %.

However, such a configuration is preferable because the reaction between materials becomes unlikely to be interrupted, and uncured components are less likely to be generated.

In addition, in the liquid crystal composition of the present invention, the content of the bi- to tetrafunctional thiol monomers, bi- to tetrafunctional thiol oligomers or bi- to tetrafunctional thiol polymers based on a total amount of the liquid crystal composition of the present invention may not necessarily be 1 to 10 mass %.

However, such a configuration is preferable because it promotes formation of a uniform crystal domain structure, it is easy to improve shielding properties and transparency of the liquid crystal composition, and uncured components are unlikely to remain.

In addition, in the liquid crystal composition of the present invention, the content of the monofunctional phosphate (meth)acrylate monomers, monofunctional phosphate (meth)acrylate oligomers or monofunctional phosphate (meth)acrylate polymers based on a total amount of the liquid crystal composition of the present invention may not necessarily be 0.1 to 3 mass %.

However, such a configuration is preferable because it is possible to improve the adhesion to the base material interface while minimizing an increase in current value when a current is applied to the liquid crystal composition.

In addition, in the liquid crystal composition of the present invention, the content of at least one organic compound selected from the group consisting of tri- to tetrafunctional aliphatic urethane acrylate monomers, tri- to tetrafunctional aliphatic urethane acrylate oligomers, tri- to tetrafunctional aliphatic urethane acrylate polymers, tri- to tetrafunctional polyester acrylate monomers, tri- to tetrafunctional polyester acrylate oligomers, tri- to tetrafunctional polyester acrylate polymers, tri- to hexafunctional (meth)acrylate ester monomers, tri- to hexafunctional (meth) acrylate ester oligomers, and tri- to hexafunctional (meth) acrylate ester polymers based on a total amount of the liquid crystal composition of the present invention may not necessarily be 1 to 20 mass %.

However, such a configuration is preferable because it facilitates formation of a crosslinked structure in the liquid crystal composition, it is possible to minimize high-voltage driving of the liquid crystal composition and it is possible to minimize deterioration in shielding properties and transparency of the liquid crystal composition.

In addition, in the liquid crystal composition of the present invention, the content of the liquid crystal compound, based on a total amount of the liquid crystal composition of the present invention may not necessarily be 40 to 80 mass %.

However, such a configuration is preferable because it is easy to maintain better dispersion properties of the liquid crystal composition, it is easy to maintain electric field responsiveness, and it is also easy to maintain processability of the liquid crystal composition.

In addition, in the liquid crystal composition of the present invention, the content of the organic compound having a glass transition temperature of higher than 0° C. based on a total amount of the liquid crystal composition of the present invention may not necessarily be 1 to 40 mass %.

That is, the liquid crystal composition of the present invention does not necessarily have to contain an organic compound having a glass transition temperature of higher than 0° C.

However, such a configuration is preferable because it imparts the rigidity to the polymer of the liquid crystal composition and it is easy to maintain a fine mesh structure of the polymer of the liquid crystal composition.

Next, a liquid crystal element of the present invention will be described.

FIG. 1 is a schematic cross-sectional view showing an example of a liquid crystal element to which the present invention is applied.

A liquid crystal element 1 of the present invention shown in FIG. 1 includes a first transparent resin film base material 2 in the form of a planar thin film.

In addition, the liquid crystal element 1 of the present invention includes a first transparent conductive film 4.

Here, the first transparent conductive film 4 is disposed on one side of the first transparent resin film base material 2 and has conductivity.

In addition, the liquid crystal element 1 of the present invention has a liquid crystal layer 6.

Here, the liquid crystal layer 6 is disposed on the side of the first transparent conductive film 4 opposite to the first transparent resin film base material 2, and contains the liquid crystal composition of the present invention.

In addition, a liquid crystal element 1 of the present invention includes a second transparent conductive film 5.

Here, the second transparent conductive film 5 is disposed on the side of the liquid crystal layer 6 opposite to the first transparent conductive film 4 and has conductivity.

In addition, the liquid crystal element 1 of the present invention includes a second transparent resin film base material 3 in the form of a planar thin film.

Here, the second transparent resin film base material 3 is disposed on the side of the second transparent conductive film 5 opposite to the liquid crystal layer 6.

That is, the first transparent conductive film 4 covers one surface of the first transparent resin film base material 2, and the second transparent conductive film 5 covers one surface of the second transparent resin film base material 3.

In addition, the liquid crystal layer 6 is in contact with the first transparent conductive film 4 and the second transparent conductive film 5.

In this manner, as shown in FIG. 1, the liquid crystal element 1 of the present invention is a laminate having a configuration in which the liquid crystal layer 6 is interposed between the first transparent resin film base material 2 on which the first transparent conductive film 4 is provided and the second transparent resin film base material 3 on which the second transparent conductive film 5 is provided.

The first transparent resin film base material 2 and the second transparent resin film base material 3 are each made of a material used for the base material of general liquid crystal elements.

Specific examples of such materials include polymer films made of polyethylene, polystyrene, polyethylene terephthalate (PET), polyvinyl alcohol, polycarbonate, polyvinyl chloride, polyimide, polysulfone, cycloolefin polymers, triacetyl cellulose and the like.

In addition, the first transparent resin film base material 2 is an example of a first base material, and the second transparent resin film base material 3 is an example of a second base material.

In addition, the first base material and the second base material do not necessarily have to be made of a resin film and can be made of, for example, a glass base material.

In addition, the first transparent conductive film 4 and the second transparent conductive film 5 are each made of a material used for the conductive film of general liquid crystal elements.

Specific examples of such materials include indium tin oxide (ITO), fluorine-doped tin oxide (FTO), tin oxide, zinc oxide, and carbon nanotubes.

In addition, the first transparent conductive film and the second transparent conductive film are examples of the first conductive film and the second conductive film.

In addition, as shown in FIG. 1, in order to apply a voltage to the liquid crystal element 1 of the present invention, a conducting wire 7 is electrically connected to the liquid crystal element 1 of the present invention.

That is, at the end of the liquid crystal element 1 of the present invention, a part of the liquid crystal layer 6 is removed to expose a part of the first transparent conductive film 4 and a part of the second transparent conductive film 5. Then, one ends of the two conducting wires 7 are electrically connected to the exposed part of the first transparent conductive film 4 and the exposed part of the second transparent conductive film 5.

Here, the other end of the conducting wire 7 is connected to a power source (not shown).

Example 1

A liquid crystal composition of the present invention was prepared using a liquid crystal compound, a polymerizable organic compound, and a polymerization initiator. Next, the liquid crystal element 1 of the present invention shown in FIG. 1 was produced using the prepared liquid crystal composition of the present invention.

Figure 2:
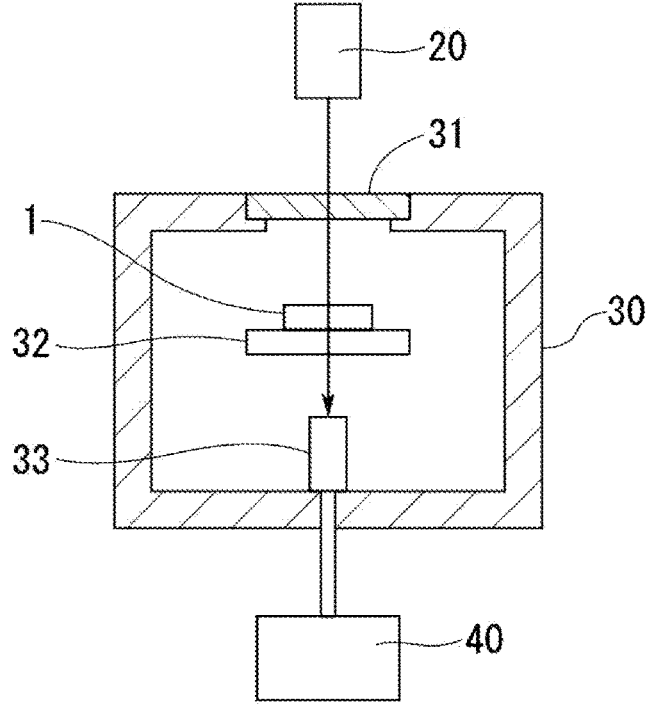
FIG. 2 is a schematic view showing an example of a device for measuring a drive response of a liquid crystal element.

Then, the drive response of the produced liquid crystal element 1 of the present invention was measured using various devices shown in FIG. 2.

That is, FIG. 2 is a schematic view showing an example of a device for measuring the drive response of the liquid crystal element.

As shown in FIG. 2, in order to measure the drive response of the liquid crystal element 1 of the present invention, a laser oscillator 20 that can emit a laser beam, a microscope temperature control stage 30 on which an observation window 31 that can transmit a laser beam, a receiver 33 that can receive the laser beam that has passed through the observation window 31, and an oscilloscope 40 that can measure the intensity of the laser beam received by the receiver 33 were used.

Here, in the microscope temperature control stage 30, a sample stand 32 on which the liquid crystal element 1 of the present invention can be placed was provided.

In addition, inside the sample stand 32, a flow path through which a refrigerant for cooling the sample stand 32 can be introduced was formed, and a heater for heating the sample stand 32 was built-in. Here, such a flow path and heater are not shown.

With such a configuration, the liquid crystal element 1 of the present invention placed on the sample stand 32 could be indirectly cooled or heated through the sample stand 32.

In addition, although not shown, there was an electrode terminal in the microscope temperature control stage 30, and a voltage could be applied to the liquid crystal element 1 of the present invention through a conducting wire.

In addition, the sample stand 32 was made of a material that can transmit a laser beam.

In addition, as shown in FIG. 2, the receiver 33 was disposed inside the microscope temperature control stage 30 and on the side of the sample stand 32 opposite to the side on which the liquid crystal element 1 of the present invention was placed.

In addition, when no voltage was applied to the liquid crystal element 1 of the present invention, the liquid crystal element 1 of the present invention did not transmit a laser beam, that is, shielded a laser beam, and when a voltage was applied to the liquid crystal element 1 of the present invention, the liquid crystal element 1 of the present invention transmitted a laser beam.

A state in which no voltage was applied to the liquid crystal element 1 of the present invention was defined as "OFF," and a state in which a voltage was applied to the liquid crystal element 1 of the present invention was defined as "ON."

Therefore, the receiver 33 could receive the laser beam that has passed through the observation window 31, the liquid crystal element 1 of the present invention, and the sample stand 32.

A nematic liquid crystal compound was used as the liquid crystal compound.

Table 1 shows physical property values of the nematic liquid crystal compounds used.

In addition, α-phenylbenzoin was used as the polymerization initiator.

TABLE 1

| | Tni | Tcn | Δε | Δn |
|---|---|---|---|---|
| Nematic liquid crystal compound | 121° C. | −50° C. | 10 | 0.24 |

As can be clearly understood from Table 1, the solid phase-nematic phase transition temperature (Tcn) of the nematic liquid crystal compound used in Example 1 was −50° C., which was 0° C. or lower.

In addition, Table 2 shows names and physical property values of a plurality of organic compounds used.

TABLE 2

| | Functionality | Organic compound | Tg | Isotropic ratio (monomer) |
|---|---|---|---|---|
| a | monofunctional | acrylate ester | −69° C. | 27.50% |
| b | bifunctional | acrylate ester | 100° C. | 55.80% |
| c | bifunctional | acrylate ester | −8° C. | 60.00% |
| d | bifunctional | acrylate ester | −35° C. | 37.90% |
| e | tetrafunctional | thiol monomer | 60° C. | 60.50% |
| f | bifunctional | aliphatic urethane acrylate | 54° C. | 75.00% |
| g | bifunctional | aliphatic urethane acrylate | −60° C. | 85.00% |
| h | trifunctional | polyester acrylate | 40° C. | 72.40% |

In Table 2, "Tg" indicates a glass transition temperature.

In addition, in Table 2, "isotropic ratio" indicates, when each organic compound is added to the nematic liquid crystal compound shown in Table 1 and polymerized, the content of each organic compound when the obtained liquid crystal composition exhibits isotropy, and the unit is mass % based on a total amount of the liquid crystal composition.

In addition, Table 3 shows the content of the nematic liquid crystal compound, the content of each organic compound, and the content of the polymerization initiator that initiates polymerization of each organic compound based on a total amount of the liquid crystal composition.

In addition, Table 3 shows the driving limit point calculated based on the FOX equation, that is, the glass transition temperature of the polymer network after polymerization.

TABLE 3

| | Functionality | Organic compound | Addition proportion | Driving limit point according to FOX equation |
|---|---|---|---|---|
| a | monofunctional | acrylate ester | 18.70% | −42° C. |
| b | bifunctional | acrylate ester | 3.10% | |
| c | bifunctional | acrylate ester | 3.30% | |
| d | bifunctional | acrylate ester | 6.40% | |
| e | tetrafunctional | thiol monomer | 1.20% | |
| f | bifunctional | aliphatic urethane acrylate | 6.70% | |
| g | bifunctional | aliphatic urethane acrylate | 3.70% | |
| h | trifunctional | polyester acrylate | 2.80% | |
| | Nematic liquid crystal compound | | 51.60% | |
| | α-phenylbenzoin | | 2.50% | |

The FOX equation is known as an equation used to calculate the glass transition temperature of copolymers.

In Table 3, the unit of "addition proportion" is mass % based on a total amount of the liquid crystal composition.

As can be clearly understood from Table 3, the content of the organic compound having a glass transition temperature of 0° C. or lower in the obtained liquid crystal composition of the present invention based on a total amount of the liquid crystal composition of the present invention was 32.1 mass %.

In addition, the content of the organic compound having a glass transition temperature of higher than 0° C. in the obtained liquid crystal composition of the present invention based on a total amount of the liquid crystal composition of the present invention was 13.8 mass %.

In addition, the liquid crystal element 1 of the present invention shown in FIG. 1 was produced using the obtained liquid crystal composition of the present invention.

That is, the first transparent conductive film 4 made of indium tin oxide (ITO) was formed on the entire surface of one side of the first transparent resin film base material 2 in the form of a thin film.

In addition, the second transparent conductive film 5 made of indium tin oxide (ITO) was also formed on the entire surface of one side of the second transparent resin film base material 3 in the form of a thin film.

In addition, the obtained liquid crystal composition and a resin for forming a column spacer were applied to the first transparent conductive film 4 of the first transparent resin film base material 2.

Then, ultraviolet rays were emitted to the applied liquid crystal composition and resin for forming a column spacer, and the organic compound contained in the liquid crystal composition was cured and polymerized to obtain the liquid crystal layer 6.

In addition, in this case, the resin for forming a column spacer was also cured with ultraviolet rays to form a column spacer with a height of 20 μm. The column spacer is not shown.

Here, ultraviolet rays were emitted using a UV exposure device having a peak of 365 nm.

The UV exposure amount in this case was 1,500 mJ/cm².

Then, the second transparent resin film base material 3 on which the second transparent conductive film 5 was formed was laminated so that the second transparent conductive film 5 was in contact with the liquid crystal layer 6.

In addition, one end of the liquid crystal layer 6 was removed to expose a part of the first transparent conductive film 4 and a part of the second transparent conductive film 5.

Then, one end of the conducting wire 7 was electrically connected to the exposed part of the first transparent conductive film 4 and the exposed part of the second transparent conductive film 5. Here, the other end of the conducting wire 7 was connected to a power source.

<Measurement of Haze Value>

For the liquid crystal element 1 of the present invention produced in Example 1, using a HAZE meter (commercially available from Nippon Denshoku Industries Co., Ltd., produce name: NDH-7000SPII), "haze value." "total light transmittance," "diffuse transmittance," and "parallel light transmittance" were measured.

That is, the applied voltage was increased by 5 V from 0 V to 60 V, and the "haze value," "total light transmittance," "diffuse transmittance," and "parallel light transmittance" at each applied voltage were measured. The measurement results are shown in Table 4.

In this specification, "haze value" indicates the ratio of diffused light to total transmitted light, and indicates the degree of cloudiness or degree of diffusion.

Figure 3:
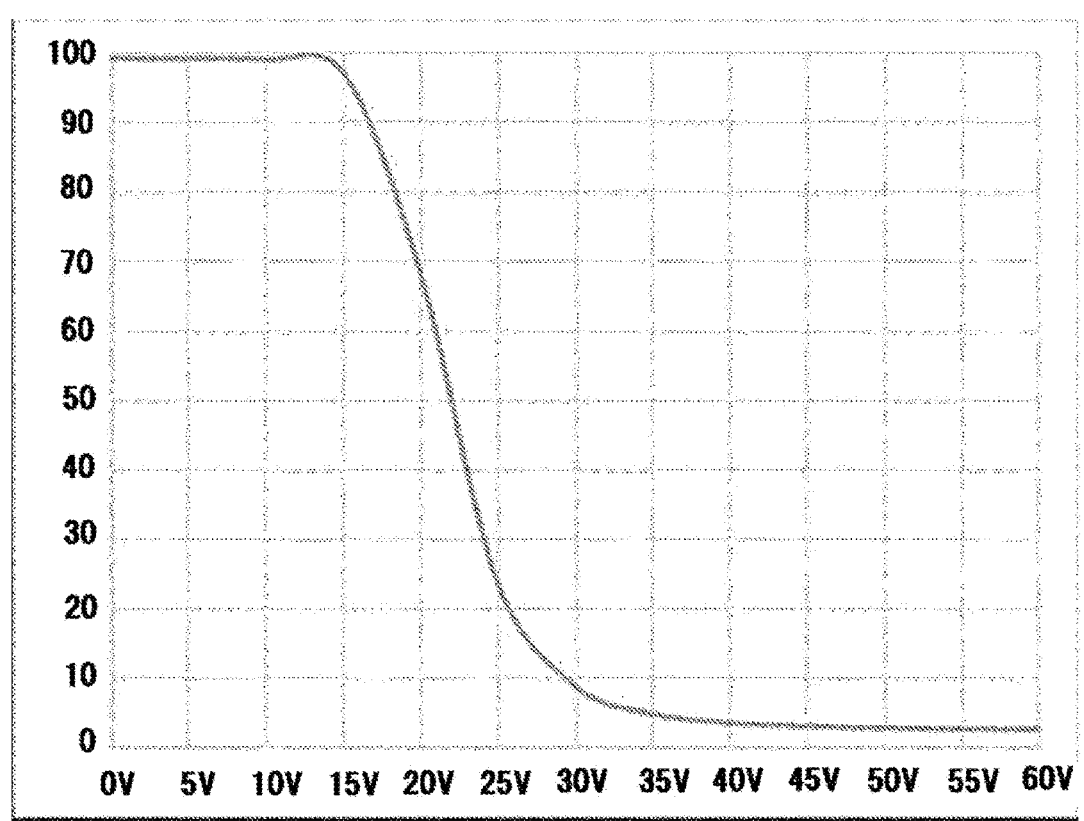
FIG. 3 is a schematic graph showing the haze value of a liquid crystal element of Example 1 to which the present invention is applied at applied voltages.

In addition, FIG. 3 shows the relationship between each applied voltage and the measured haze value.

That is, FIG. 3 is a schematic graph showing the haze value of the liquid crystal element of Example 1 to which the present invention was applied at each applied voltage. The vertical axis in FIG. 3 represents haze value (%), and the horizontal axis in FIG. 3 represents applied voltage (V).

TABLE 4

| Voltage | Haze value | Total light transmittance | Diffuse transmittance | Parallel light transmittance |
|---|---|---|---|---|
| 0 V | 99.20% | 43.50% | 43.20% | 0.40% |
| 5 V | 99.20% | 43.90% | 43.50% | 0.40% |
| 10 V | 99.00% | 45.40% | 45.00% | 0.50% |
| 15 V | 97.10% | 51.30% | 49.80% | 1.50% |
| 20 V | 68.20% | 63.60% | 43.30% | 20.30% |
| 25 V | 23.70% | 69.10% | 16.40% | 52.70% |
| 30 V | 8.90% | 70.50% | 6.30% | 64.20% |
| 35 V | 5.00% | 71.00% | 3.50% | 67.50% |
| 40 V | 3.70% | 71.30% | 2.70% | 68.60% |
| 45 V | 3.20% | 71.40% | 2.30% | 69.10% |
| 50 V | 3.00% | 71.60% | 2.10% | 69.40% |
| 55 V | 2.80% | 71.60% | 2.00% | 69.60% |
| 60 V | 2.80% | 71.70% | 2.00% | 69.80% |

<Measurement of Drive Response>

When the temperature of the liquid crystal element 1 of the present invention produced in Example 1 was 25° C., −10° C., −20° C., −30° C., −35° C., −40° C. and −45° C., the drive response of the liquid crystal element 1 of the present invention was measured using various devices shown in FIG. 2.

Specifically, the drive response of the liquid crystal element 1 of the present invention was measured as follows.

The liquid crystal element 1 of the present invention was placed on the sample stand 32 inside the microscope temperature control stage 30, and the liquid crystal element 1 of the present invention was cooled through the sample stand 32.

Then, the liquid crystal element 1 of the present invention was cooled through the sample stand 32, and the temperature of the liquid crystal element 1 of the present invention was set to −10° C., −20° C., −30° C., −35° C., −40° C. and −45° C.

Here, when the temperature of the liquid crystal element 1 of the present invention was set to 25° C., the liquid crystal element 1 of the present invention was neither heated nor cooled through the sample stand 32, or it was heated.

In addition, a laser beam emitted from the laser oscillator 20 was applied to the liquid crystal element 1 of the present invention, which had been cooled to a temperature of −10° C., −20° C., −30° C., −35° C., −40° C. and −45° C.

In this case, the laser beam passed through the observation window 31 provided on the microscope temperature control stage 30 and was applied to the liquid crystal element 1 of the present invention.

In addition, a voltage of 100 V was applied for 300 seconds while a laser beam was applied to the liquid crystal element 1 of the present invention at each temperature, and voltage application was then stopped.

In addition, the intensity of the laser beam that has passed through the liquid crystal element 1 of the present invention and the sample stand 32 and received by the receiver 33 was measured with the oscilloscope 40.

The results are shown in FIG. 4A to FIG. 4F.

In addition, using a mechanism in which the liquid crystal element 1 of the present invention in the "ON" state, which is a state in which a voltage was applied, transmitted a laser beam, and the liquid crystal element 1 of the present invention in the "OFF" state, which is a state in which no voltage was applied, shielded a laser beam, the time (OFF→ON) from the "OFF" state to the "ON" state at each temperature and the time (ON→OFF) from the "ON" state to the "OFF" state at each temperature were measured.

The results are shown in Table 5.

Figure 4A:
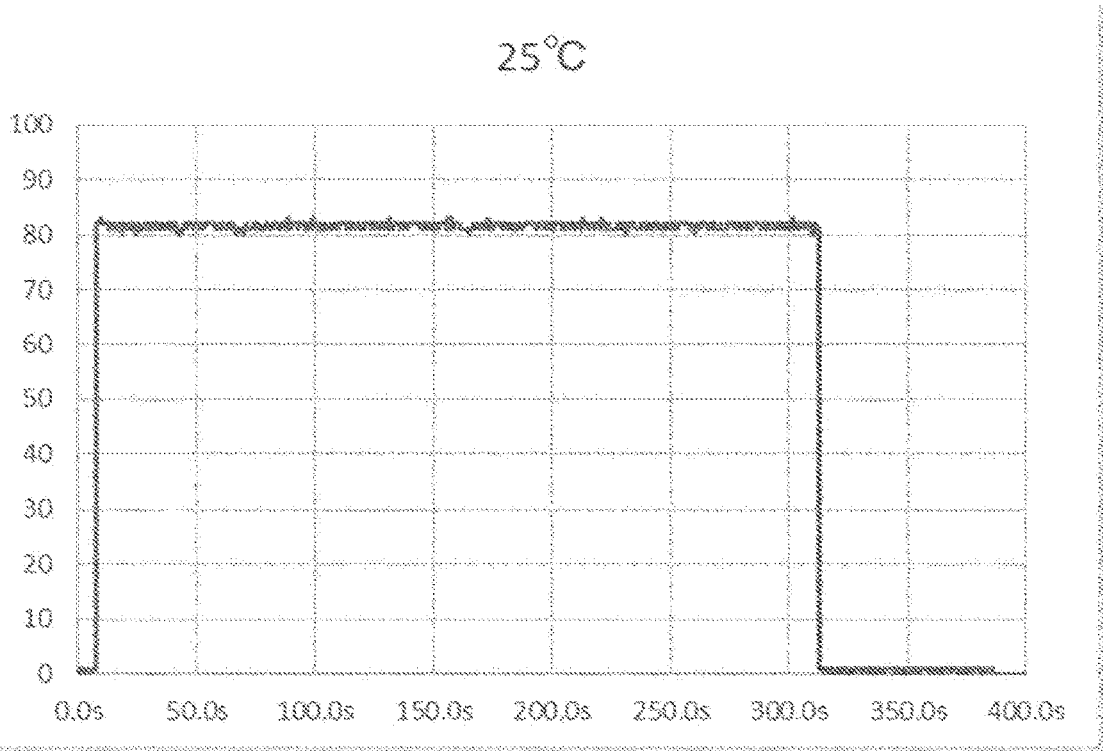
FIG. 4A is a schematic graph showing the drive response of the liquid crystal element of Example 1 to which the present invention is applied at 25° C.

That is, FIG. 4A is a schematic graph showing the drive response of the liquid crystal element of Example 1 to which the present invention was applied at 25° C.

Figure 4B:
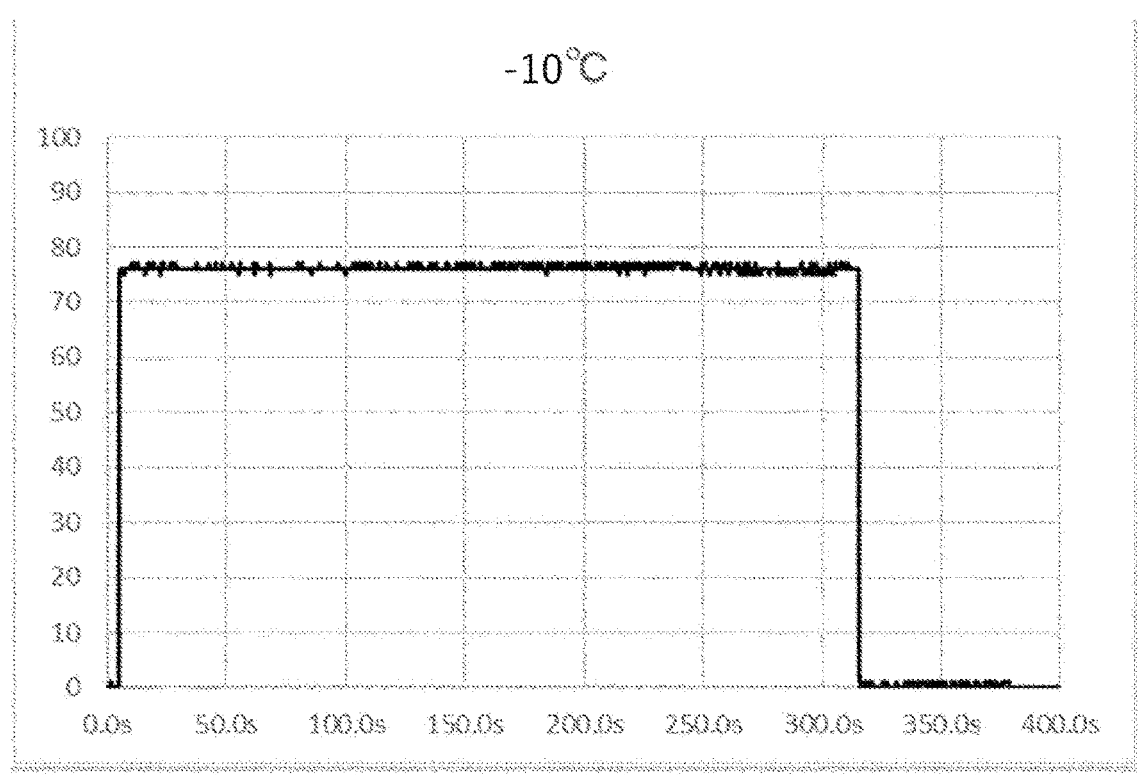
FIG. 4B is a schematic graph showing the drive response of the liquid crystal element of Example 1 to which the present invention is applied at −10° C.

In addition, FIG. 4B is a schematic graph showing the drive response of the liquid crystal element of Example 1 to which the present invention was applied at −10° C.

Figure 4C:
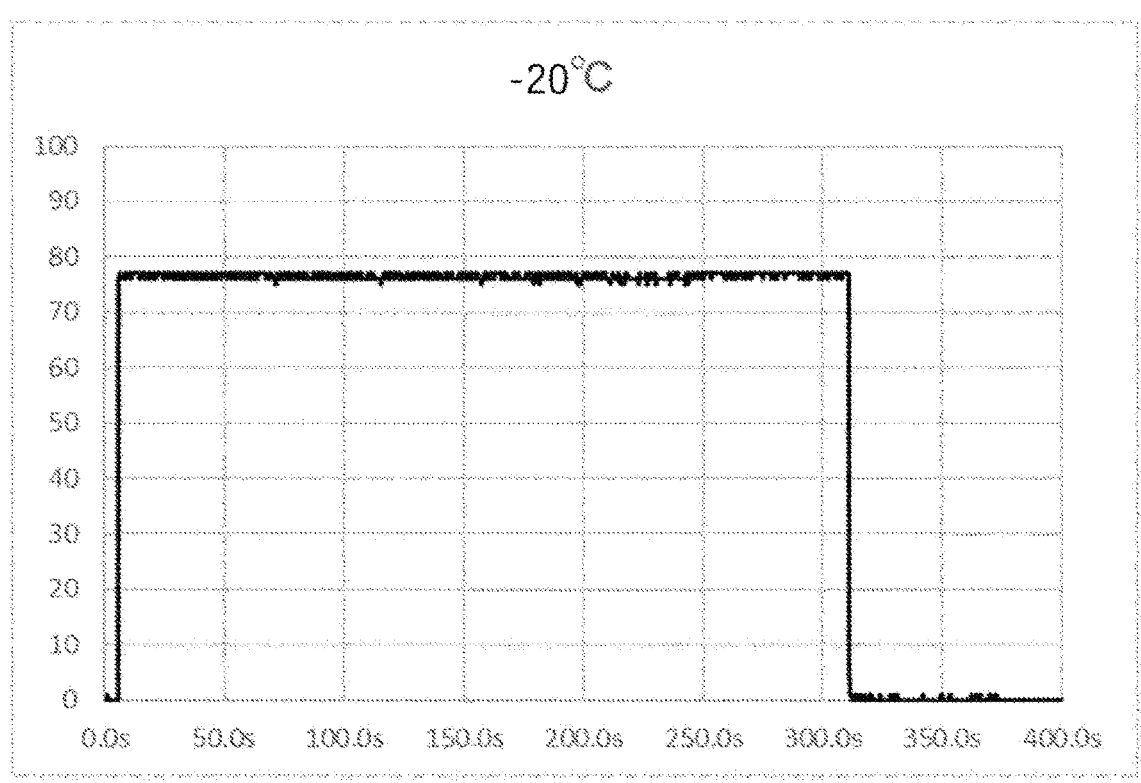
FIG. 4C is a schematic graph showing the drive response of the liquid crystal element of Example 1 to which the present invention is applied at −20° C.

In addition, FIG. 4C is a schematic graph showing the drive response of the liquid crystal element of Example 1 to which the present invention was applied at −20° C.

Figure 4D:
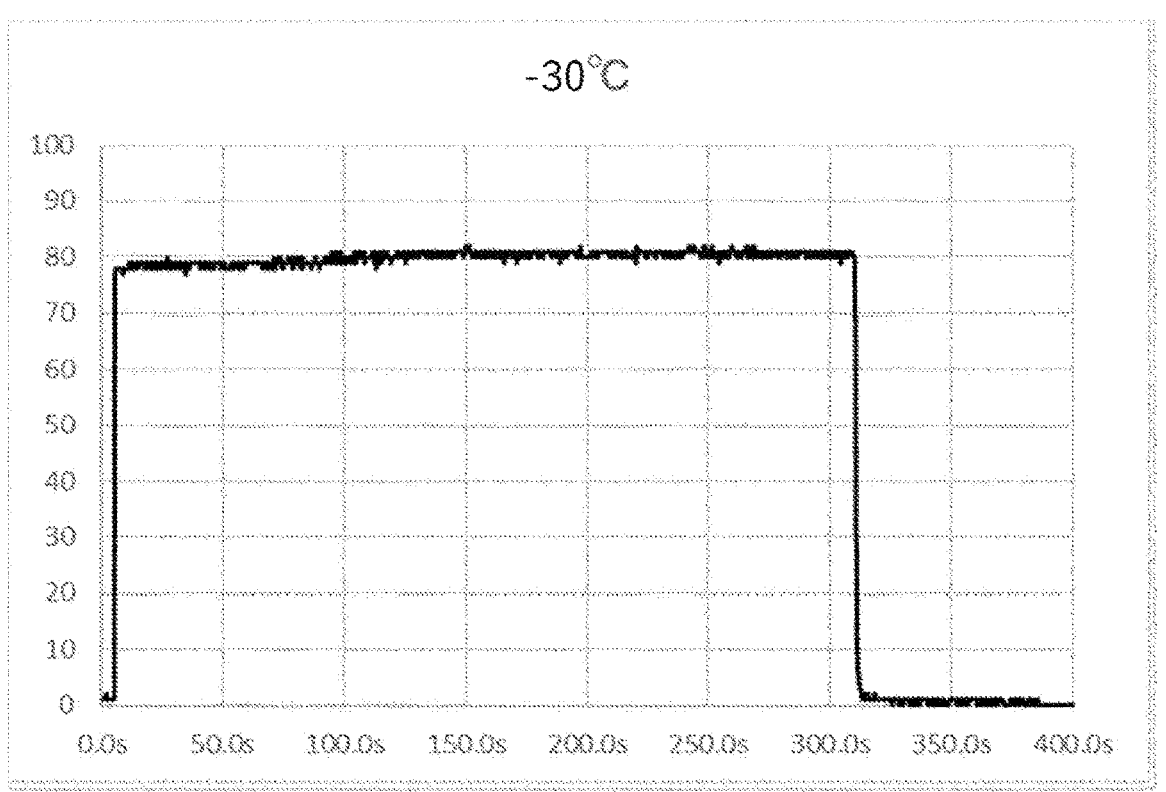
FIG. 4D is a schematic graph showing the drive response of the liquid crystal element of Example 1 to which the present invention is applied at −30° C.

In addition, FIG. 4D is a schematic graph showing the drive response of the liquid crystal element of Example 1 to which the present invention was applied at −30° C.

Figure 4E:
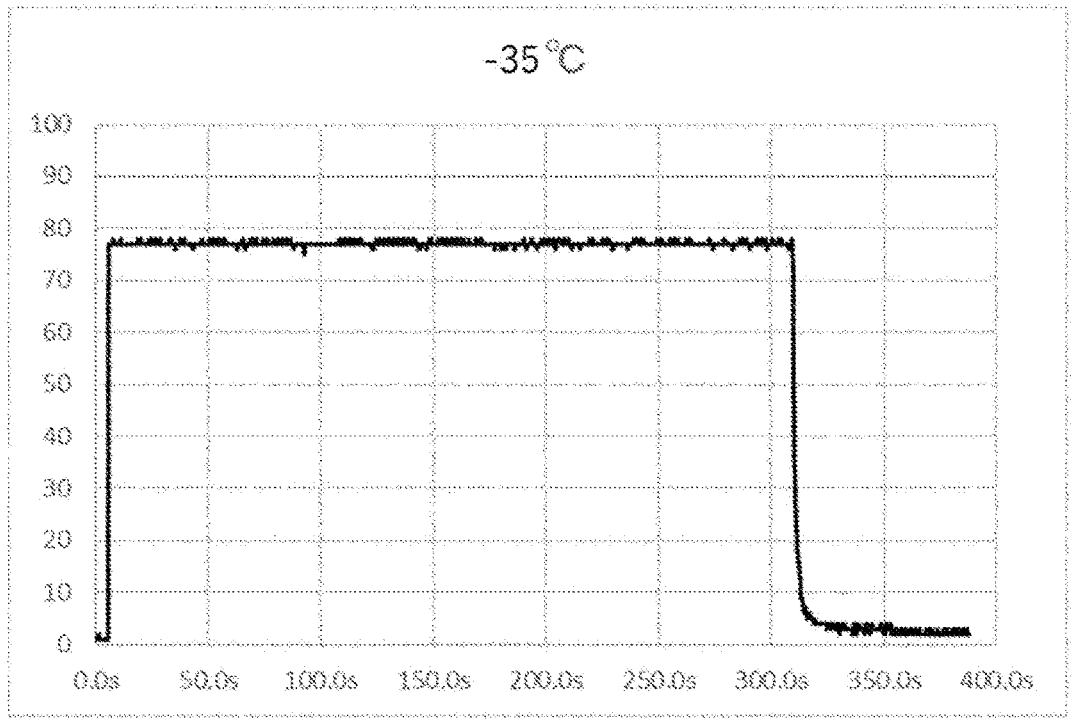
FIG. 4E is a schematic graph showing the drive response of the liquid crystal element of Example 1 to which the present invention is applied at −35° C.

In addition, FIG. 4E is a schematic graph showing the drive response of the liquid crystal element of Example 1 to which the present invention was applied at −35° C.

Figure 4F:
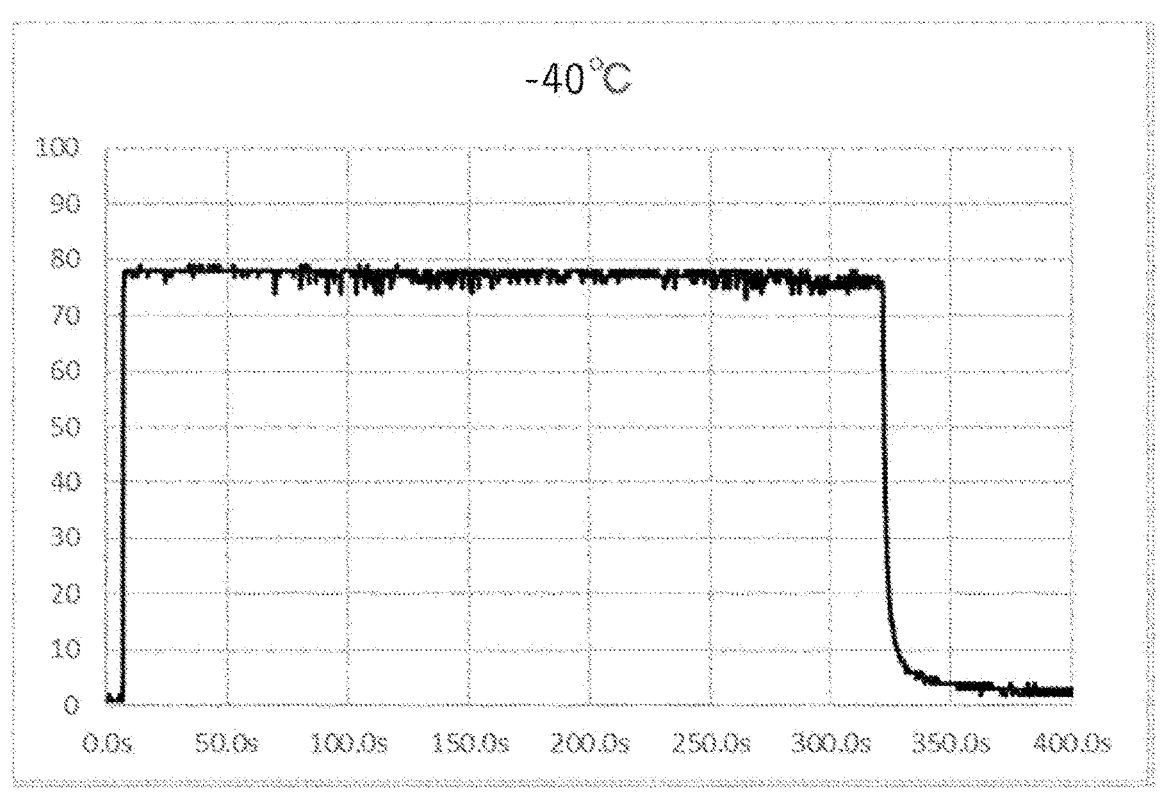
FIG. 4F is a schematic graph showing the drive response of the liquid crystal element of Example 1 to which the present invention is applied at −40° C.

In addition, FIG. 4F is a schematic graph showing the drive response of the liquid crystal element of Example 1 to which the present invention was applied at −40° C.

The vertical axis in FIG. 4A to FIG. 4F represents laser light transmission intensity, and the horizontal axis in FIG. 4A to FIG. 4F represents time (seconds).

As can be clearly understood from Table 4, the liquid crystal element of the present invention, that is, the liquid crystal element produced using the liquid crystal composition of the present invention had a haze value of 99.2% when no voltage was applied and had a haze value of 2.8% when a voltage of 60 V was applied.

Based on these results, it was confirmed that the liquid crystal element of the present invention had strong shielding properties and high transparency.

In addition, as can be clearly understood from Table 5, for the liquid crystal element of the present invention, that is, the liquid crystal element produced using the liquid crystal composition of the present invention, it was confirmed that the "OFF→ON" response time and the "ON→OFF" response time at 0° C. or lower, that is, −10° C. to −30° C., were both 0.1 seconds or shorter, and a drive response could be achieved.

In addition, for the liquid crystal element of the present invention, it was confirmed that the "ON→OFF" response time at −35° C. to −40° C. was 1 second or longer, but a drive response could be achieved. In addition, the "OFF→ON" response time at −35° C. to −40° C. was 0.1 seconds or shorter.

In addition, it was confirmed that the liquid crystal element of the present invention was not driven at −45° C.

In addition, since the state of the liquid crystal did not change sharply, but gradually changed from a certain temperature range in a curved manner, it was confirmed that there was similarity between the predicted temperature of −42° C. as the driving limit point according to the FOX equation shown in Table 3 and −45° C., which was confirmed as a temperature at which the liquid crystal element of the present invention was not driven in the liquid crystal composition prepared in Example 1.

Example 2

A Liquid crystal composition of the present invention was prepared using a liquid crystal compound, a polymerizable organic compound, and a polymerization initiator. Next, the liquid crystal element 1 of the present invention shown in FIG. 1 was produced using the prepared liquid crystal composition of the present invention.

Then, the drive response of the produced liquid crystal element 1 of the present invention was measured using various devices shown in FIG. 2.

In addition, as the liquid crystal compound, the same liquid crystal compound as in Example 1 was used. That is, a nematic liquid crystal compound having physical property values shown in Table 1 was used.

In addition, α-phenylbenzoin was used as the polymerization initiator.

In addition, Table 6 shows names and physical property values of a plurality of organic compounds used.

TABLE 5

| | 25° C. | −10° C. | −20° C. | −30° C. | −35° C. | −40° C. | −45° C. |
|---|---|---|---|---|---|---|---|
| OFF→ON | 0.1 seconds or shorter | 0.1 seconds or shorter | 0.1 seconds or shorter | 0.1 seconds or shorter | 0.1 seconds or shorter | 0.1 seconds or shorter | not driven |
| ON→OFF | 0.1 seconds or shorter | 0.1 seconds or shorter | 0.1 seconds or shorter | 0.1 seconds or shorter | 1.6 seconds | 3.6 seconds | |

TABLE 6

| | Functionality | Organic compound | Tg | Isotropic ratio (monomer) |
|---|---|---|---|---|
| a | monofunctional | acrylate ester | 98° C. | 31.50% |
| b | monofunctional | acrylate ester | 65° C. | 53.10% |
| c | bifunctional | acrylate ester | -8° C. | 60.00% |
| d | bifunctional | aliphatic urethane acrylate | -55° C. | 85.00% |
| e | bifunctional | aliphatic urethane acrylate | 54° C. | 75.00% |
| f | bifunctional | aliphatic urethane acrylate | 40° C. | 72.40% |
| g | tetrafunctional | thiol monomer | 60° C. | 60.50% |
| h | tetrafunctional | acrylate ester | 65° C. | 76.80% |

In Table 6, "Tg" indicates a glass transition temperature.

In addition, in Table 6, "isotropic ratio" indicates, when each organic compound is added to the nematic liquid crystal compound shown in Table 1 and polymerized, the content of each organic compound when the obtained liquid crystal composition exhibits isotropy, and the unit is mass % based on a total amount of the liquid crystal composition.

In addition, Table 7 shows the content of the nematic liquid crystal compound, the content of each organic compound, and the content of the polymerization initiator that initiates polymerization of each organic compound based on a total amount of the liquid crystal composition.

In addition, Table 7 shows the driving limit point calculated based on the FOX equation, that is, the glass transition temperature of the polymer network after polymerization.

TABLE 7

| | Functionality | Organic compound | Addition proportion | Driving limit point according to FOX equation |
|---|---|---|---|---|
| a | monofunctional | acrylate ester | 24.30% | -13 C. |
| b | monofunctional | acrylate ester | 1.10% | |
| c | bifunctional | acrylate ester | 8.20% | |
| d | bifunctional | aliphatic urethane acrylate | 6.60% | |
| e | bifunctional | aliphatic urethane acrylate | 1.60% | |
| f | bifunctional | aliphatic urethane acrylate | 3.10% | |
| g | tetrafunctional | thiol monomer | 1.60% | |
| h | tetrafunctional | acrylate ester | 3.00% | |
| | Nematic liquid crystal compound | | 48.00% | |
| | α-phenylbenzoin | | 2.50% | |

In Table 7, the unit of "addition proportion" is mass % based on a total amount of the liquid crystal composition.

As can be clearly understood from Table 7, the content of the organic compound having a glass transition temperature of 0° C. or lower in the obtained liquid crystal composition of the present invention based on a total amount of the liquid crystal composition of the present invention was 14.8 mass %.

In addition, the content of the organic compound having a glass transition temperature of higher than 0° C. in the obtained liquid crystal composition of the present invention based on a total amount of the liquid crystal composition of the present invention was 34.7 mass %.

In addition, the liquid crystal element 1 of the present invention shown in FIG. 1 was produced using the obtained liquid crystal composition of the present invention.

<Measurement of Haze Value>

For the liquid crystal element 1 of the present invention produced in Example 2, the "haze value," "total light transmittance," "diffuse transmittance," and "parallel light transmittance" were measured in the same manner as in Example 1.

The measurement results are shown in Table 8.

In addition, the schematic graph showing the haze value of the liquid crystal element of Example 2 to which the present invention was applied at each applied voltage is omitted because it shows almost the same series as the series shown in the schematic graph shown in FIG. 3.

TABLE 8

| Voltage | Haze value | Total light transmittance | Diffuse transmittance | Parallel light transmittance |
|---|---|---|---|---|
| 0 V | 99.30% | 50.70% | 50.30% | 0.30% |
| 5 V | 99.40% | 51.30% | 51.00% | 0.30% |
| 10 V | 99.40% | 54.40% | 54.10% | 0.30% |
| 15 V | 92.30% | 64.10% | 59.20% | 4.90% |
| 20 V | 49.40% | 70.20% | 34.70% | 35.60% |
| 25 V | 16.60% | 70.80% | 11.70% | 59.00% |
| 30 V | 7.20% | 70.90% | 5.10% | 65.80% |
| 35 V | 4.70% | 71.00% | 3.40% | 67.70% |
| 40 V | 3.80% | 71.20% | 2.70% | 68.50% |
| 45 V | 3.50% | 71.30% | 2.50% | 68.90% |
| 50 V | 3.30% | 71.40% | 2.30% | 69.10% |
| 55 V | 3.20% | 71.60% | 2.30% | 69.30% |
| 60 V | 3.20% | 71.70% | 2.30% | 69.40% |

<Measurement of Drive Response>

When the temperature of the liquid crystal element 1 of the present invention produced in Example 2 was 25° C., 20° C., 10° C., 0° C., -5° C., -10° C. and -15° C., the drive response of the liquid crystal element 1 of the present invention was measured in the same manner as in Example 1 using various devices shown in FIG. 2.

The results are shown in Table 9.

In addition, a voltage of 100 V was applied for 300 seconds while a laser beam was applied to the liquid crystal element 1 of the present invention at each temperature, and voltage application was then stopped.

In addition, the intensity of the laser beam that has passed through the liquid crystal element 1 of the present invention and the sample stand 32 and received by the receiver 33 was measured with the oscilloscope 40.

Figure 5A:
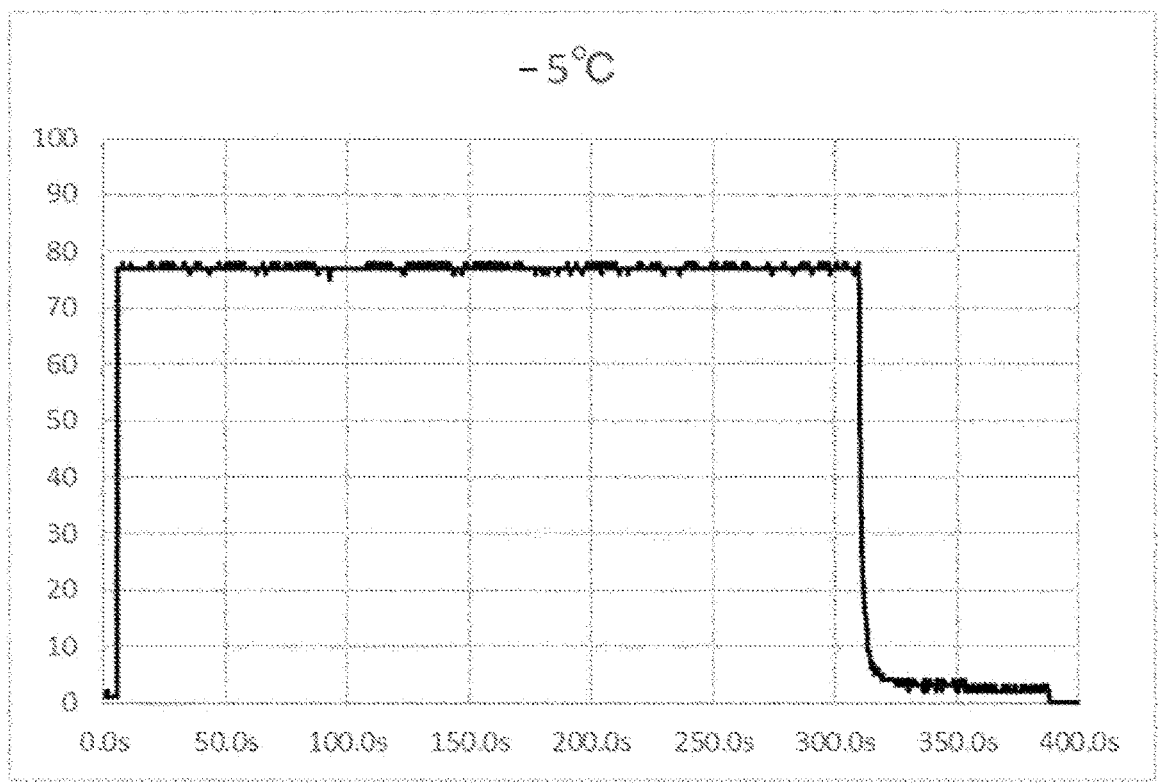
FIG. 5A is a schematic graph showing the drive response of a liquid crystal element of Example 2 to which the present invention is applied at −5° C.
Figure 5B:
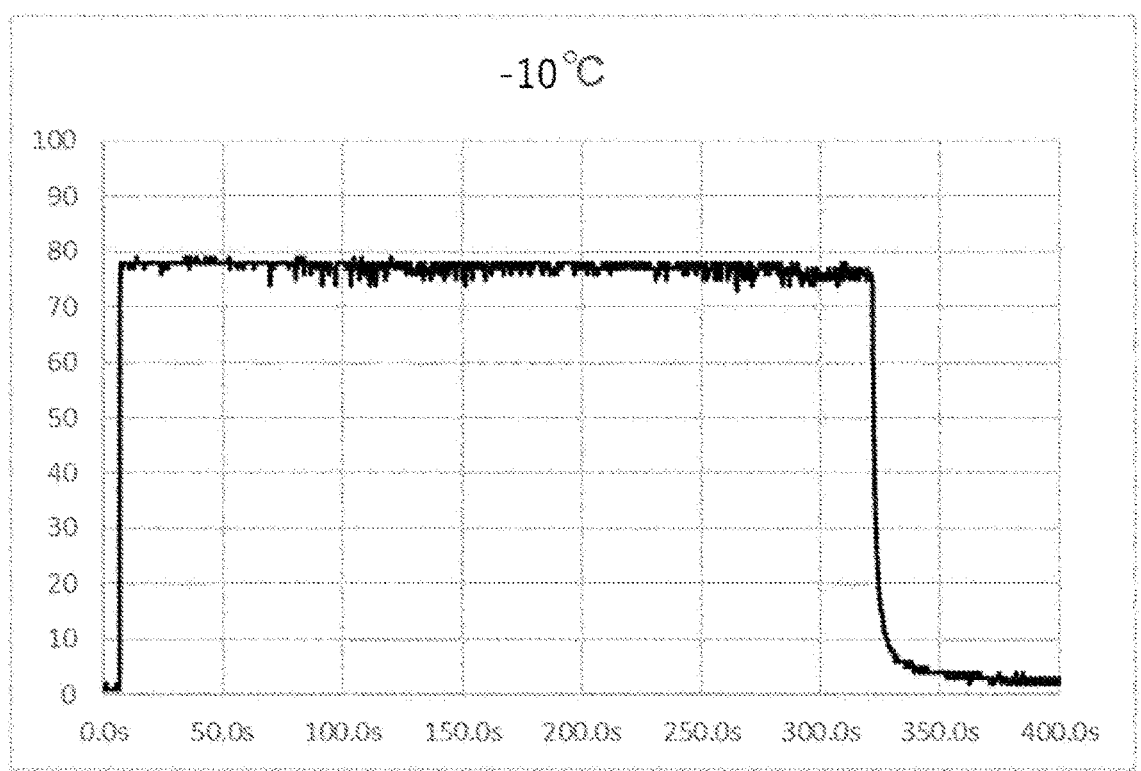
FIG. 5B is a schematic graph showing the drive response of the liquid crystal element of Example 2 to which the present invention is applied at −10° C.

The results are shown in FIG. 5A and FIG. 5B.

That is, FIG. 5A is a schematic graph showing the drive response of the liquid crystal element of Example 2 to which the present invention was applied at -5° C.

In addition, FIG. 5B is a schematic graph showing the drive response of the liquid crystal element of Example 2 to which the present invention was applied at -10° C.

Here, the schematic graph showing the drive response of the liquid crystal element of Example 2 to which the present invention was applied at 25° C., 20° C., 10° C. and 0° C. is omitted because it shows almost the same series as the series shown in FIG. 4A.

The vertical axis in FIG. 5A and FIG. 5B represents laser light transmission intensity, and the horizontal axis in FIG. 5A and FIG. 5B represents time (seconds).

TABLE 9

| | 25° C. | 20° C. | 10° C. | 0° C. | −5° C. | −10° C. | −15° C. |
|---|---|---|---|---|---|---|---|
| OFF→ON | 0.2 seconds or shorter | 0.2 seconds or shorter | 0.2 seconds or shorter | 0.2 seconds or shorter | 0.2 seconds or shorter | 0.2 seconds or shorter | not driven |
| ON→OFF | 0.2 seconds or shorter | 0.2 seconds or shorter | 0.2 seconds or shorter | 0.2 seconds or shorter | 1.0 second | 3.2 seconds | |

As can be clearly understood from Table 8, the liquid crystal element of the present invention, that is, the liquid crystal element produced using the liquid crystal composition of the present invention had a haze value of 99.3% when no voltage was applied and had a haze value of 3.2% when a voltage of 60 V was applied.

Based on these results, it was confirmed that the liquid crystal element of the present invention had strong shielding properties and high transparency.

In addition, as can be clearly understood from Table 9, for the liquid crystal element of the present invention, that is, the liquid crystal element produced using the liquid crystal composition of the present invention, it was confirmed that the "OFF→ON" response time and the "ON→OFF" response time at 0° C. or lower, that is, 0° C., were both 0.2 seconds or shorter, and a drive response could be achieved.

In addition, for the liquid crystal element of the present invention, it was confirmed that the "ON→OFF" response time at −5° C. and −10° C. was 1 second or longer, and a drive response could be achieved. In addition, the "OFF→ON" response time at −5° C. and −10° C. was 0.2 seconds or shorter.

In addition, it was confirmed that the liquid crystal element of the present invention was not driven at −15° C.

In addition, it was confirmed that there was similarity between the predicted temperature of −13° C. as the driving limit point according to the FOX equation shown in Table 7, and −15° C., which was confirmed as a temperature at which the liquid crystal element of the present invention was not driven in the liquid crystal composition prepared in Example 2.

Example 3

A liquid crystal composition of the present invention was prepared using a liquid crystal compound, a polymerizable organic compound, and a polymerization initiator. Next, the liquid crystal element 1 of the present invention shown in FIG. 1 was produced using the prepared liquid crystal composition of the present invention.

Then, the drive response of the produced liquid crystal element 1 of the present invention was measured using various devices shown in FIG. 2.

In addition, as the liquid crystal compound, the same liquid crystal compound as in Example 1 was used. That is, a nematic liquid crystal compound having physical property values shown in Table 1 was used.

In addition, α-phenylbenzoin was used as the polymerization initiator.

In addition, Table 10 shows names and physical property values of a plurality of organic compounds used.

TABLE 10

| | Functionality | Organic compound | Tg | Isotropic ratio (monomer) |
|---|---|---|---|---|
| a | monofunctional | acrylate ester | −69° C. | 27.50% |
| b | bifunctional | acrylate ester | −35° C. | 37.90% |

TABLE 10-continued

| | Functionality | Organic compound | Tg | Isotropic ratio (monomer) |
|---|---|---|---|---|
| c | tetrafunctional | thiol monomer | 60° C. | 60.50% |
| d | bifunctional | aliphatic urethane acrylate | 54° C. | 75.00% |
| e | trifunctional | acrylate ester | 40° C. | 72.40% |

In Table 10, "Tg" indicates a glass transition temperature.

In addition, in Table 10, "isotropic ratio" indicates, when each organic compound is added to the nematic liquid crystal compound shown in Table 1 and polymerized, the content of each organic compound when the obtained liquid crystal composition exhibits isotropy, and the unit is mass % based on a total amount of the liquid crystal composition.

In addition, Table 11 shows the content of the nematic liquid crystal compound, the content of each organic compound, and the content of the polymerization initiator that initiates polymerization of each organic compound based on a total amount of the liquid crystal composition.

In addition, Table 11 shows the driving limit point calculated based on the FOX equation, that is, the glass transition temperature of the polymer network after polymerization.

TABLE 11

| | Functionality | Organic compound | Addition proportion | Driving limit point according to FOX equation |
|---|---|---|---|---|
| a | monofunctional | acrylate ester | 27.60% | −52° C. |
| b | bifunctional | acrylate ester | 1.40% | |
| c | tetrafunctional | thiol monomer | 1.40% | |
| d | bifunctional | aliphatic urethane acrylate | 1.50% | |
| e | trifunctional | acrylate ester | 1.00% | |
| | Nematic liquid crystal compound | | 64.60% | |
| | α-phenylbenzoin | | 2.50% | |

In Table 11, the unit of "addition proportion" is mass % based on a total amount of the liquid crystal composition.

As can be clearly understood from Table 11, the content of the organic compound having a glass transition temperature of 0° C. or lower in the obtained liquid crystal composition of the present invention based on a total amount of the liquid crystal composition of the present invention was 29.0 mass %.

In addition, the content of the organic compound having a glass transition temperature of higher than 0° C. in the obtained liquid crystal composition of the present invention based on a total amount of the liquid crystal composition of the present invention was 3.9 mass %.

In addition, the liquid crystal element 1 of the present invention shown in FIG. 1 was produced using the obtained liquid crystal composition of the present invention.

23

24

<Measurement of Haze Value>

For the liquid crystal element 1 of the present invention produced in Example 3, the "haze value," "total light transmittance," "diffuse transmittance," and "parallel light transmittance" were measured in the same manner as in Example 1.

The measurement results are shown in Table 12.

In addition, the schematic graph showing the haze value of the liquid crystal element of Example 3 to which the present invention was applied at each applied voltage is omitted because it shows almost the same series as the series shown in the schematic graph shown in FIG. 3.

TABLE 12

| Voltage | Haze value | Total light transmittance | Diffuse transmittance | Parallel light transmittance |
|---|---|---|---|---|
| 0 V | 99.00% | 74.80% | 74.10% | 0.80% |
| 5 V | 99.00% | 75.40% | 74.60% | 0.80% |
| 10 V | 98.40% | 78.00% | 76.80% | 1.20% |
| 15 V | 87.30% | 83.80% | 73.20% | 10.70% |
| 20 V | 53.00% | 86.80% | 46.00% | 40.80% |
| 25 V | 28.70% | 87.70% | 25.20% | 62.50% |
| 30 V | 17.90% | 88.00% | 15.70% | 72.30% |
| 35 V | 12.80% | 88.20% | 11.30% | 76.90% |
| 40 V | 10.10% | 88.30% | 8.90% | 79.40% |
| 45 V | 8.40% | 88.40% | 7.40% | 81.00% |
| 50 V | 7.30% | 88.40% | 6.50% | 82.00% |
| 55 V | 6.50% | 88.50% | 5.80% | 82.70% |
| 60 V | 6.00% | 88.50% | 5.30% | 83.30% |

<Measurement of Drive Response>

When the temperature of the liquid crystal element 1 of the present invention produced in Example 3 was 25° C., −10° C., −20° C., −30° C., −35° C., −40° C., −50° C. and −55° C., the drive response of the liquid crystal element 1 of the present invention was measured in the same manner as in Example 1 using various devices shown in FIG. 2.

The results are shown in Table 13.

In addition, a voltage of 100 V was applied for 300 seconds while a laser beam was applied to the liquid crystal element 1 of the present invention at each temperature, and voltage application was then stopped.

In addition, the intensity of the laser beam that has passed through the liquid crystal element 1 of the present invention and the sample stand 32 and received by the receiver 33 was measured with the oscilloscope 40.

Figure 6:
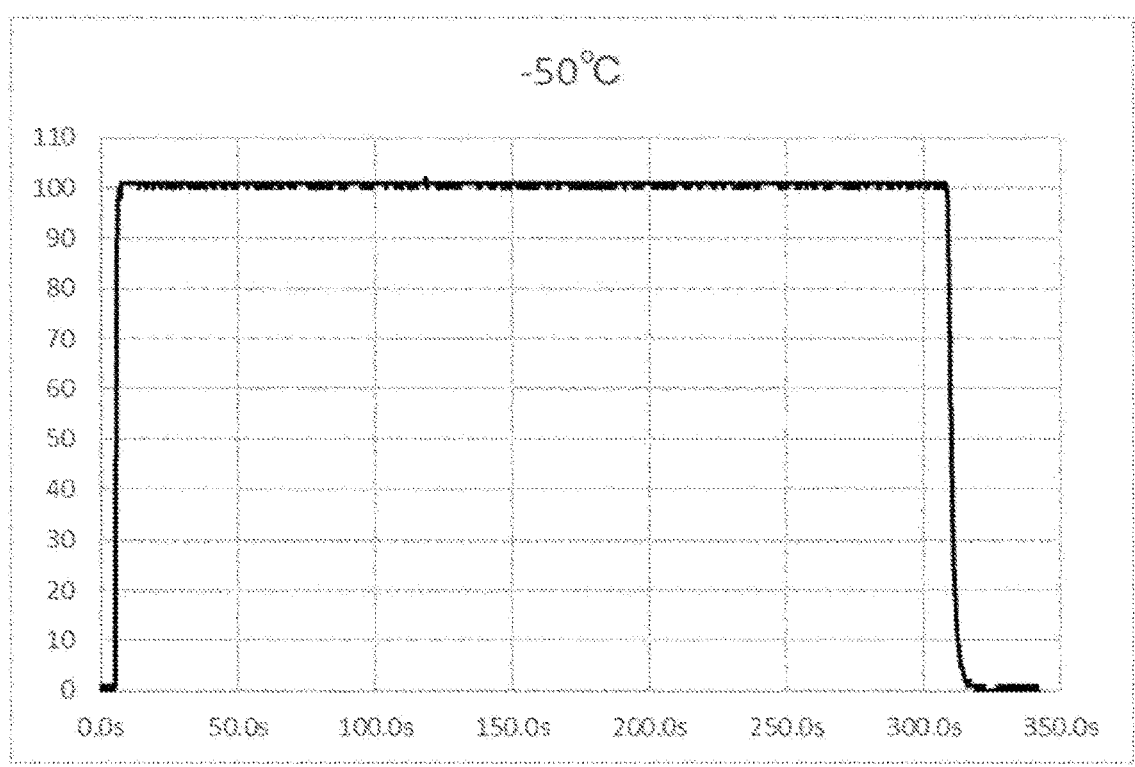
FIG. 6 is a schematic graph showing the drive response of a liquid crystal element of Example 3 to which the present invention is applied at −50° C.

The results are shown in FIG. 6.

That is, FIG. 6 is a schematic graph showing the drive response of the liquid crystal element of Example 3 to which the present invention was applied at −50° C.

Here, the schematic graph showing the drive response of the liquid crystal element of Example 3 to which the present invention was applied at 25° C., −10° C., −20° C., −30° C., −35° C., and −40° C. is omitted because it shows almost the same series as the series shown in the schematic graph in FIG. 4A to FIG. 4F.

The vertical axis in FIG. 6 represents laser light transmission intensity, and the horizontal axis in FIG. 6 represents time (seconds).

As can be clearly understood from Table 12, the liquid crystal element of the present invention, that is, the liquid crystal element produced using the liquid crystal composition of the present invention had a haze value of 99.0% when no voltage was applied and had a haze value of 6.0% when a voltage of 60 V was applied.

Based on these results, it was confirmed that the liquid crystal element of the present invention had strong shielding properties and high transparency.

In addition, as can be clearly understood from Table 13, for the liquid crystal element of the present invention, that is, the liquid crystal element produced using the liquid crystal composition of the present invention, it was confirmed that the "OFF→ON" response time and the "ON→OFF" response time at 0° C. or lower, that is, −10° C. to −40° C., were both 0.1 seconds or shorter, and a drive response could be achieved.

In addition, for the liquid crystal element of the present invention, it was confirmed that the "OFF→ON" response time and the "ON→OFF" response time at −50° C. were both longer than 0.1 seconds, but a drive response could be achieved.

In addition, it was confirmed that the liquid crystal element of the present invention was not driven at −55° C.

In addition, it was confirmed that there was similarity between the predicted temperature of −52° C. as the driving limit point according to the FOX equation shown in Table 11 and −55° C., which was confirmed as a temperature at which the liquid crystal element of the present invention was not driven in the liquid crystal composition prepared in Example 3.

Example 4

A liquid crystal composition of the present invention was prepared using a liquid crystal compound, a polymerizable organic compound, and a polymerization initiator. Next, the liquid crystal element 1 of the present invention shown in FIG. 1 was produced using the prepared liquid crystal composition of the present invention.

Then, the drive response of the produced liquid crystal element 1 of the present invention was measured using various devices shown in FIG. 2.

In addition, a smectic liquid crystal compound was used as the liquid crystal compound.

Table 14 shows physical property values of the smectic liquid crystal compounds used.

In addition, α-phenylbenzoin was used as the polymerization initiator.

TABLE 14

| | Tni | Tsn | Δε | Δn |
|---|---|---|---|---|
| Smectic liquid crystal compound | 118° C. | −20° C. | 8.5 | 0.22 |

As can be clearly understood from Table 14, the smectic phase-nematic phase transition temperature (Tsn) of the

TABLE 13

| | 25° C. | −10° C. | −20° C. | −30° C. | −35° C. | −40° C. | −50° C. | −55° C. |
|---|---|---|---|---|---|---|---|---|
| OFF→ON | 0.1 seconds or shorter | 0.1 seconds or shorter | 0.1 seconds or shorter | 0.1 seconds or shorter | 0.1 seconds or shorter | 0.1 seconds or shorter | 0.8 seconds | not driven |
| ON→OFF | 0.1 seconds or shorter | 0.1 seconds or shorter | 0.1 seconds or shorter | 0.1 seconds or shorter | 0.1 seconds or shorter | 0.1 seconds or shorter | 3.9 seconds | | smectic liquid crystal compound used in Example 4 was −20° C., which was 0° C. or lower.

In addition, Table 15 shows names and physical property values of a plurality of organic compounds used.

TABLE 15

| | Functionality | Organic compound | Tg | Isotropic ratio (monomer) |
|---|---|---|---|---|
| a | monofunctional | acrylate ester | −71° C. | 22% |
| b | bifunctional | acrylate ester | −20° C. | 66% |
| c | bifunctional | aliphatic urethane acrylate | 14° C. | 60% |
| d | trifunctional | thiol monomer | 43° C. | 61% |
| e | bifunctional | acrylate ester | 20° C. | 52% |

In Table 15, "Tg" indicates a glass transition temperature.

In addition, in Table 15, "isotropic ratio" indicates, when each organic compound is added to the smectic liquid crystal compound shown in Table 14 and polymerized, the content of each organic compound when the obtained liquid crystal composition exhibits isotropy, and the unit is mass % based on a total amount of the liquid crystal composition.

In addition, Table 16 shows the content of the smectic liquid crystal compound, the content of each organic compound, and the content of the polymerization initiator that initiates polymerization of each organic compound based on a total amount of the liquid crystal composition.

TABLE 16

| | Functionality | Organic compound | Addition proportion | Driving limit point according to FOX equation |
|---|---|---|---|---|
| a | monofunctional | acrylate ester | 19.80% | −27.4° C. |
| b | bifunctional | acrylate ester | 7.40% | |
| c | bifunctional | aliphatic urethane acrylate | 5.00% | |
| d | trifunctional | thiol monomer | 2.00% | |
| e | bifunctional | acrylate ester | 7.40% | |
| | | smectic liquid crystal compound | 55.90% | |
| | | α-phenylbenzoin | 2.50% | |

In Table 16, the unit of "addition proportion" is mass % based on a total amount of the liquid crystal composition.

As can be clearly understood from Table 16, the content of the organic compound having a glass transition temperature of 0° C. or lower in the obtained liquid crystal composition of the present invention based on a total amount of the liquid crystal composition of the present invention was 27.2 mass %.

In addition, the content of the organic compound having a glass transition temperature of higher than 0° C. in the obtained liquid crystal composition of the present invention based on a total amount of the liquid crystal composition of the present invention was 14.4 mass %.

In addition, the liquid crystal element 1 of the present invention shown in FIG. 1 was produced using the obtained liquid crystal composition of the present invention.

<Measurement of Haze Value>

For the liquid crystal element 1 of the present invention produced in Example 4, the "haze value," "total light transmittance," "diffuse transmittance," and "parallel light transmittance" were measured in the same manner as in Example 1.

The measurement results are shown in Table 17.

In addition, the schematic graph showing the haze value of the liquid crystal element of Example 4 to which the present invention was applied at each applied voltage is omitted because it shows almost the same series as the series shown in the schematic graph shown in FIG. 3.

TABLE 17

| Voltage | Haze value | Total light transmittance | Diffuse transmittance | Parallel light transmittance |
|---|---|---|---|---|
| 0 V | 99.30% | 52.60% | 52.20% | 0.40% |
| 5 V | 99.20% | 53.00% | 52.60% | 0.40% |
| 10 V | 99.10% | 54.60% | 54.10% | 0.50% |
| 15 V | 97.60% | 60.40% | 58.90% | 1.50% |
| 20 V | 72.60% | 73.00% | 53.00% | 20.00% |
| 25 V | 26.40% | 78.80% | 20.80% | 58.00% |
| 30 V | 9.90% | 80.30% | 8.00% | 72.40% |
| 35 V | 5.70% | 80.80% | 4.60% | 76.30% |
| 40 V | 4.30% | 81.10% | 3.50% | 77.60% |
| 45 V | 3.80% | 81.20% | 3.10% | 78.20% |
| 50 V | 3.50% | 81.40% | 2.80% | 78.50% |
| 55 V | 3.30% | 81.40% | 2.70% | 78.80% |
| 60 V | 3.30% | 81.40% | 2.70% | 78.80% |

<Measurement of Drive Response>

When the temperature of the liquid crystal element 1 of the present invention produced in Example 4 was 25° C., −10° C., −15° C., −20° C., −25° C. and −30° C., the drive response of the liquid crystal element 1 of the present invention was measured in the same manner as in Example 1 using various devices shown in FIG. 2.

The results are shown in Table 18.

In addition, a voltage of 100 V was applied for 300 seconds while a laser beam was applied to the liquid crystal element 1 of the present invention at each temperature, and voltage application was then stopped.

In addition, the intensity of the laser beam that has passed through the liquid crystal element 1 of the present invention and the sample stand 32 and received by the receiver 33 was measured with the oscilloscope 40.

Figure 7:
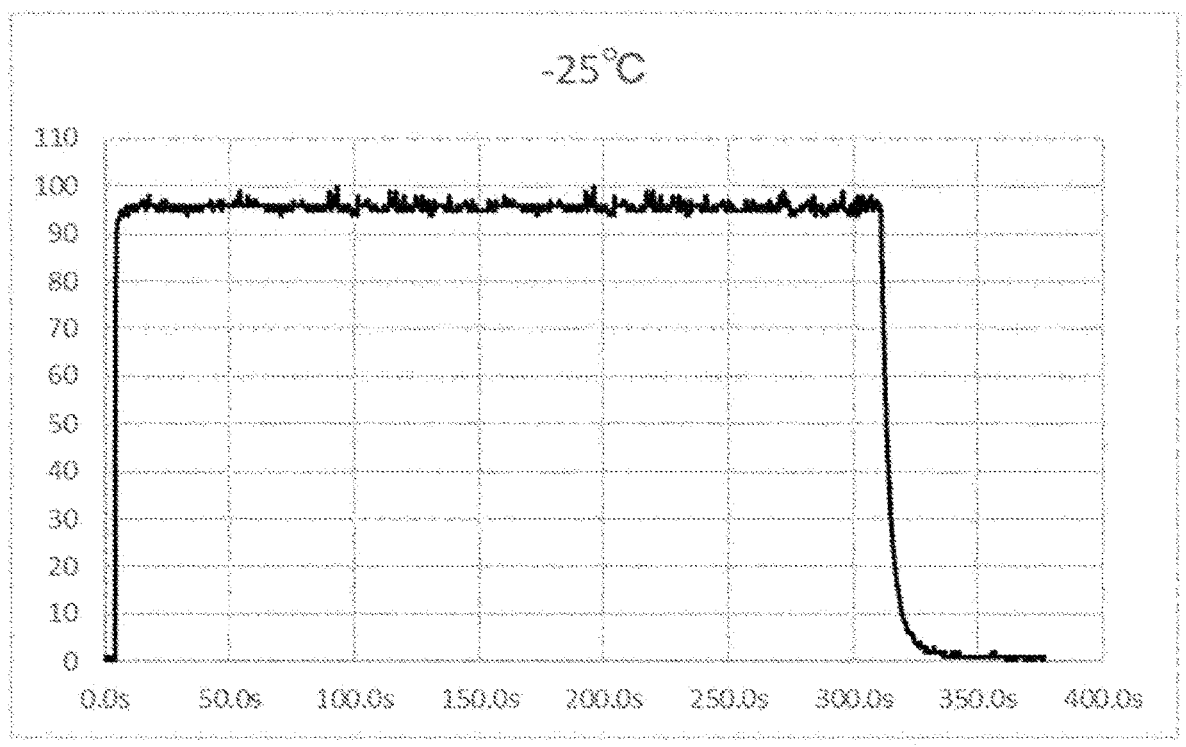
FIG. 7 is a schematic graph showing the drive response of a liquid crystal element of Example 4 to which the present invention is applied at −25° C.

The results are shown in FIG. 7.

That is, FIG. 7 is a schematic graph showing the drive response of the liquid crystal element of Example 4 to which the present invention was applied at −25° C. Here, the schematic graph showing the drive response of the liquid crystal element of Example 4 to which the present invention was applied at 25° C., −10° C., −15° C., and −20° C. is omitted because it shows almost the same series as the series shown in the schematic graph in FIG. 4A to FIG. 4C.

The vertical axis in FIG. 7 represents laser light transmission intensity, and the horizontal axis in FIG. 7 represents time (seconds).

TABLE 18

| | 25° C. | −10° C. | −15° C. | −20° C. | −25° C. | −30° C. |
|---|---|---|---|---|---|---|
| OFF→ON | 0.1 seconds or shorter | 0.1 seconds or shorter | 0.1 seconds or shorter | 0.1 seconds or shorter | 0.1 seconds or shorter | not driven |
| ON→OFF | 0.1 seconds or shorter | 0.1 seconds or shorter | 0.1 seconds or shorter | 0.1 seconds or shorter | 16.8 seconds | |

As can be clearly understood from Table 17, the liquid crystal element of the present invention, that is, the liquid crystal element produced using the liquid crystal composition of the present invention had a haze value of 99.3% when no voltage was applied and had a haze value of 3.3% when a voltage of 60 V was applied.

Based on these results, it was confirmed that the liquid crystal element of the present invention had strong shielding properties and high transparency.

In addition, as can be clearly understood from Table 18, for the liquid crystal element of the present invention, that is, the liquid crystal element produced using the liquid crystal composition of the present invention, it was confirmed that the "OFF→ON" response time and the "ON→OFF" response time at 0° C. or lower, that is, –10° C. to –20° C., were 0.1 seconds or shorter, and a drive response could be achieved.

In addition, for the liquid crystal element of the present invention, it was confirmed that the "ON→OFF" response time at –25° C. was 15 seconds or longer, but a drive response could be achieved. In addition, it was confirmed that the "OFF→ON" response time at –25° C. was 0.1 seconds or shorter, and a drive response could be achieved.

In addition, it was confirmed that the liquid crystal element of the present invention was not driven at –30° C.

In addition, it was confirmed that there was similarity between the predicted temperature of –27.4° C. as the driving limit point according to the FOX equation shown in Table 16 and –30° C., which was confirmed as a temperature at which the liquid crystal element of the present invention was not driven in the liquid crystal composition prepared in Example 4.

Comparative Example 1

A liquid crystal composition was prepared using a liquid crystal compound, a polymerizable organic compound, and a polymerization initiator. Next, a liquid crystal element having the same structure as the liquid crystal element of the present invention shown in FIG. 1 was produced using the prepared liquid crystal composition.

Then, the drive response of the produced liquid crystal element was measured using various devices shown in FIG. 2.

In addition, a nematic liquid crystal compound was used as the liquid crystal compound.

Table 19 shows physical property values of the nematic liquid crystal compounds used.

In addition, α-phenylbenzoin was used as the polymerization initiator.

TABLE 19

|  | Tni | Tcn | Δε | Δn |
|---|---|---|---|---|
| Nematic liquid crystal compound | 120° C. | 3° C. | 7.4 | 0.2 |

As can be clearly understood from Table 19, the solid phase-nematic phase transition temperature (Tcn) of the nematic liquid crystal compound used in Comparative Example 1 was 3° C., which was higher than 0° C.

In addition, Table 20 shows names and physical property values of a plurality of organic compounds used.

TABLE 20

|  | Functionality | Organic compound | Tg | Isotropic ratio (monomer) |
|---|---|---|---|---|
| a | monofunctional | acrylate ester | –71° C. | 25% |
| b | bifunctional | acrylate ester | –13° C. | 54% |
| c | bifunctional | aliphatic urethane acrylate | 2° C. | 58% |
| d | trifunctional | thiol monomer | 49° C. | 63% |
| e | bifunctional | acrylate ester | 40° C. | 52% |

In Table 20, "Tg" indicates a glass transition temperature.

In addition, in Table 20, "isotropic ratio" indicates, when each organic compound is added to the nematic liquid crystal compound shown in Table 19 and polymerized, the content of each organic compound when the obtained liquid crystal composition exhibits isotropy, and the unit is mass % based on a total amount of the liquid crystal composition.

In addition, Table 21 shows the content of the nematic liquid crystal compound, the content of each organic compound, and the content of the polymerization initiator that initiates polymerization of each organic compound based on a total amount of the liquid crystal composition.

TABLE 21

|  | Functionality | Organic compound | Addition proportion | Driving limit point according to FOX equation |
|---|---|---|---|---|
| a | monofunctional | acrylate ester | 19.50% | –14.6° C. |
| b | bifunctional | acrylate ester | 5.50% |  |
| c | bifunctional | aliphatic urethane acrylate | 11.90% |  |
| d | trifunctional | thiol monomer | 3.40% |  |
| e | bifunctional | acrylate ester | 2.10% |  |
|  | Nematic liquid crystal compound |  | 54.30% |  |
|  | α-phenylbenzoin |  | 3.30% |  |

In Table 21, the unit of "addition proportion" is mass % based on a total amount of the liquid crystal composition.

As can be clearly understood from Table 21, the content of the organic compound having a glass transition temperature of 0° C. or lower in the obtained liquid crystal composition based on a total amount of the liquid crystal composition was 25 mass %.

In addition, the content of the organic compound having a glass transition temperature of higher than 0° C. in the obtained liquid crystal composition based on a total amount of the liquid crystal composition was 17.4 mass %.

In addition, using the obtained liquid crystal composition, a liquid crystal element having the same structure as the liquid crystal element of the present invention shown in FIG. 1 was produced.

Here, the UV exposure amount in this case was 1,750 mJ/cm$^2$.

<Measurement of Haze Value>

For the liquid crystal element produced in Comparative Example 1, the "haze value," "total light transmittance," "diffuse transmittance," and "parallel light transmittance" were measured in the same manner as in Example 1.

The measurement results are shown in Table 22.

TABLE 22

| Voltage | Haze value | Total light transmittance | Diffuse transmittance | Parallel light transmittance |
|---|---|---|---|---|
| 0 V | 99.00% | 66.60% | 65.90% | 0.70% |
| 5 V | 98.80% | 68.20% | 67.40% | 0.80% |
| 10 V | 97.50% | 73.40% | 71.60% | 1.80% |

TABLE 22-continued

| Voltage | Haze value | Total light transmittance | Diffuse transmittance | Parallel light transmittance |
|---|---|---|---|---|
| 15 V | 89.90% | 79.60% | 71.60% | 8.10% |
| 20 V | 60.20% | 84.80% | 51.10% | 33.80% |
| 25 V | 35.40% | 86.50% | 30.60% | 55.80% |
| 30 V | 21.10% | 87.10% | 18.40% | 68.70% |
| 35 V | 13.90% | 87.40% | 12.10% | 75.30% |
| 40 V | 10.10% | 87.60% | 8.80% | 78.80% |
| 45 V | 8.00% | 87.80% | 7.00% | 80.80% |
| 50 V | 6.80% | 87.90% | 6.00% | 81.90% |
| 55 V | 6.00% | 88.00% | 5.30% | 82.70% |
| 60 V | 5.50% | 88.10% | 4.80% | 83.20% |

<Measurement of Drive Response>

When the temperature of the liquid crystal element produced in Comparative Example 1 was 25° C., 20° C., 15° C., 10° C., 5° C. and 0° C., the drive response of the liquid crystal element was measured in the same manner as in Example 1 using various devices shown in FIG. 2.

The results are shown in Table 23.

TABLE 23

| | 25° C. | 20° C. | 15° C. | 10° C. | 5° C. | 0° C. |
|---|---|---|---|---|---|---|
| OFF→ON | 0.1 seconds or shorter | 0.1 seconds or shorter | 0.1 seconds or shorter | 0.1 seconds or shorter | 0.1 seconds or shorter | not driven |
| ON→OFF | 0.1 seconds or shorter | 0.1 seconds or shorter | 8.6 seconds | 17.2 seconds | 45.9 seconds | not driven |

As can be clearly understood from Table 22, the liquid crystal element produced using the liquid crystal composition of Comparative Example 1 had a haze value of 99. % when no voltage was applied and had a haze value of 5. % when a voltage of 60 V was applied.

In addition, as can be clearly understood from Table 23, for the liquid crystal element produced using the liquid crystal composition of Comparative Example 1, the "ON→OFF" response time at 5° C. was 45 seconds or longer.

Here, it was confirmed that the liquid crystal element produced using the liquid crystal composition of Comparative Example 1 was not driven at 0° C.

In addition, in the liquid crystal composition prepared in Comparative Example 1, there was a large difference between the predicted temperature of −14.6° C. as the driving limit point according to the FOX equation shown in Table 21 and the temperature (0° C.) at which the element was not actually driven.

Since the solid phase-nematic phase transition temperature (Tcn) of the nematic liquid crystal compound used in Comparative Example 1 was 3° C., it was confirmed that, regarding the liquid crystal composition of Comparative Example 1, the physical property values of the liquid crystal compound had priority.

As described above, since the liquid crystal element of the present invention had a liquid crystal layer containing the liquid crystal composition of the present invention, it could be driven at 0° C. or lower.

That is, in the liquid crystal composition of the present invention, since the liquid crystal compound had a solid phase-nematic phase transition temperature or smectic phase-nematic phase transition temperature of 0° C. or lower, even in a low temperature environment of 0° C. or lower, the liquid crystal composition after polymerization could maintain flexibility and did not inhibit liquid crystal driving.

In addition, in the liquid crystal composition of the present invention, since the content of the polymerizable organic compound having a glass transition temperature of 0° C. or lower was 10 mass % or more, the glass transition temperature of the polymerized organic compound could also be lowered to 0° C. or lower, and even in a low temperature environment of 0° C. or lower, the liquid crystal composition could maintain flexibility.

Therefore, the liquid crystal composition of the present invention allows the liquid crystal element to be driven at 0° C. or lower, and the liquid crystal element of the present invention having a liquid crystal layer containing such a liquid crystal composition of the present invention could be driven at 0° C. or lower.

The invention claimed is:

1. A liquid crystal composition containing polymerizable organic compounds and a liquid crystal compound,
   wherein the liquid crystal compound has a solid phase-nematic phase transition temperature or smectic phase-nematic phase transition temperature of 0° C. or lower,
   wherein some of the polymerizable organic compounds have a glass transition temperature of 0° C. or lower, and a content of the some of the polymerizable organic compounds having a glass transition temperature of 0° C. or lower based on a total amount of the liquid crystal composition, is 10 to 60 mass %, and
   wherein the some of the polymerizable organic compounds having a glass transition temperature of 0° C. or lower comprise at least one selected from the group consisting of bifunctional aliphatic urethane acrylate monomers, trifunctional aliphatic urethane acrylate monomers, tetrafunctional aliphatic urethane acrylate monomers, bifunctional aliphatic urethane acrylate oligomers, trifunctional aliphatic urethane acrylate oligomers, tetrafunctional aliphatic urethane acrylate oligomers, bifunctional aliphatic urethane acrylate polymers, trifunctional aliphatic urethane acrylate polymers, tetrafunctional aliphatic urethane acrylate polymers, bifunctional thiol monomers, trifunctional thiol monomers, tetrafunctional thiol monomers, bifunctional thiol oligomers, trifunctional thiol oligomers, tetrafunctional thiol oligomers, bifunctional thiol polymers, trifunctional thiol polymers, tetrafunctional thiol polymers, monofunctional phosphate (meth)acrylate monomers, monofunctional phosphate (meth)acrylate oligomers and monofunctional phosphate (meth) acrylate polymers, and
   at least one selected from the group consisting of bifunctional aliphatic oligomer acrylate monomers, trifunctional aliphatic oligomer acrylate monomers, tetrafunctional aliphatic oligomer acrylate monomers, bifunctional aliphatic oligomer acrylate oligomers, trifunctional aliphatic oligomer acrylate oligomers, tetrafunctional aliphatic oligomer acrylate oligomers, bifunctional aliphatic oligomer acrylate polymers, trifunctional aliphatic oligomer acrylate polymers, tetrafunctional aliphatic oligomer acrylate polymers, bifunctional polyester acrylate monomers, trifunctional polyester acrylate monomers, tetrafunctional polyester acrylate monomers, bifunctional polyester acrylate oligomers, trifunctional polyester acrylate oligomers, tetrafunctional polyester acrylate oligomers, bifunctional polyester acrylate polymers, trifunctional polyester acrylate polymers, tetrafunctional polyester acrylate polymers, monofunctional (meth)acrylate ester monomers, bifunctional (meth)acrylate ester monomers, trifunctional (meth)acrylate ester monomers, tetrafunctional (meth)acrylate ester monomers, pentafunctional (meth)acrylate ester monomers, hexafunctional (meth) acrylate ester monomers, monofunctional (meth)acrylate ester oligomers, bifunctional (meth)acrylate ester oligomers, trifunctional (meth)acrylate ester oligomers, tetrafunctional (meth)acrylate ester oligomers, pentafunctional (meth)acrylate ester oligomers, hexafunctional (meth)acrylate ester oligomers, monofunctional (meth)acrylate ester polymers, bifunctional (meth) acrylate ester polymers, trifunctional (meth)acrylate ester polymers, tetrafunctional (meth)acrylate ester polymers, pentafunctional (meth)acrylate ester polymers and hexafunctional (meth)acrylate ester polymers,
wherein a content of the monofunctional (meth)acrylate ester monomers, the monofunctional (meth)acrylate ester oligomers or the monofunctional (meth)acrylate ester polymers based on the total amount of the liquid crystal composition is 10 to 40 mass %,
wherein a content of the at least one of the some of the polymerizable organic compounds selected from the group consisting of the bifunctional (meth)acrylate ester monomers, the bifunctional (meth)acrylate ester oligomers, the bifunctional (meth)acrylate ester polymers, the bifunctional aliphatic urethane acrylate monomers, the bifunctional aliphatic urethane acrylate oligomers, the bifunctional aliphatic urethane acrylate polymers, the bifunctional aliphatic oligomer acrylate monomers, the bifunctional aliphatic oligomer acrylate oligomers, the bifunctional aliphatic oligomer acrylate polymers, the bifunctional polyester acrylate monomers, the bifunctional polyester acrylate oligomers and the bifunctional polyester acrylate polymers based on the total amount of the liquid crystal composition is 1 to 30 mass %,
wherein a content of the bifunctional thiol monomers, the trifunctional thiol monomers, the tetrafunctional thiol monomers, the bifunctional thiol oligomers, the trifunctional thiol oligomers, the tetrafunctional thiol oligomers, the bifunctional thiol polymers, the trifunctional thiol polymers, or the tetrafunctional thiol polymers based on the total amount of the liquid crystal composition is 1 to 10 mass %,
wherein a content of the monofunctional phosphate (meth)acrylate monomers, the monofunctional phosphate (meth)acrylate oligomers or the monofunctional phosphate (meth)acrylate polymers based on the total amount of the liquid crystal composition is 0.1 to 3 mass %, and
wherein a content of at least one of the some of the polymerizable organic compounds selected from the group consisting of the trifunctional aliphatic urethane acrylate monomers, the tetrafunctional aliphatic urethane acrylate monomers, the trifunctional aliphatic urethane acrylate oligomers, the tetrafunctional aliphatic urethane acrylate oligomers, the trifunctional aliphatic urethane acrylate polymers, the tetrafunctional aliphatic urethane acrylate polymers, the trifunctional polyester acrylate monomers, the tetrafunctional polyester acrylate monomers, the trifunctional polyester acrylate oligomers, the tetrafunctional polyester acrylate oligomers, the trifunctional polyester acrylate polymers, the tetrafunctional polyester acrylate polymers, the trifunctional (meth)acrylate ester monomers, the tetrafunctional (meth)acrylate ester monomers, the pentafunctional (meth)acrylate ester monomers, hexafunctional (meth)acrylate ester monomers, the trifunctional (meth)acrylate ester oligomers, the tetrafunctional (meth)acrylate ester oligomers, the pentafunctional (meth)acrylate ester oligomers, the hexafunctional (meth)acrylate ester oligomers, the trifunctional (meth)acrylate ester polymers, the tetrafunctional (meth)acrylate ester polymers, the pentafunctional (meth)acrylate ester polymers, and the hexafunctional (meth)acrylate ester polymers based on the total amount of the liquid crystal composition is 1 to 20 mass %.

2. The liquid crystal composition according to claim 1, wherein the content of the liquid crystal compound based on the total amount of the liquid crystal composition is 40 to 80 mass %.

3. The liquid crystal composition according to claim 1, wherein the polymerizable organic compounds further comprise at least one organic compound having a glass transition temperature of higher than 0° C., and wherein a content of the at least one organic compound having a glass transition temperature of higher than 0° C. based on the total amount of the liquid crystal composition is 1 to 40 mass %.

4. A liquid crystal composition containing polymerizable organic compounds and a liquid crystal compound, wherein the liquid crystal compound has a solid phase-nematic phase transition temperature or smectic phase-nematic phase transition temperature of 0° C. or lower, wherein some of the polymerizable organic compounds have a glass transition temperature of 0° C. or lower, and a content of the some of the polymerizable organic compounds having a glass transition temperature of 0° C. or lower based on a total amount of the liquid crystal composition is 10 mass % or more, and wherein the some of the polymerizable organic compounds having a glass transition temperature of 0° C. or lower comprise at least one selected from the group consisting of bifunctional aliphatic urethane acrylate monomers, trifunctional aliphatic urethane acrylate monomers, tetrafunctional aliphatic urethane acrylate monomers, bifunctional aliphatic urethane acrylate oligomers, trifunctional aliphatic urethane acrylate oligomers, tetrafunctional aliphatic urethane acrylate oligomers, bifunctional aliphatic urethane acrylate polymers, trifunctional aliphatic urethane acrylate polymers, tetrafunctional aliphatic urethane acrylate polymers, bifunctional thiol monomers, trifunctional thiol monomers, tetrafunctional thiol monomers, bifunctional thiol oligomers, trifunctional thiol oligomers, tetrafunctional thiol oligomers, bifunctional thiol polymers, trifunctional thiol polymers, tetrafunctional thiol polymers, monofunctional phosphate (meth)acrylate monomers, monofunctional phosphate (meth)acrylate oligomers and monofunctional phosphate (meth) acrylate polymers, and
at least one selected from the group consisting of bifunctional aliphatic oligomer acrylate monomers, trifunctional aliphatic oligomer acrylate monomers, tetrafunctional aliphatic oligomer acrylate monomers, bifunctional aliphatic oligomer acrylate oligomers, trifunctional aliphatic oligomer acrylate oligomers, tetrafunctional aliphatic oligomer acrylate oligomers, bifunctional aliphatic oligomer acrylate polymers, trifunctional aliphatic oligomer acrylate polymers, tetrafunctional aliphatic oligomer acrylate polymers, bifunctional polyester acrylate monomers, trifunctional polyester acrylate monomers, tetrafunctional polyester acrylate monomers, bifunctional polyester acrylate oligomers, trifunctional polyester acrylate oligomers, tetrafunctional polyester acrylate oligomers, bifunctional polyester acrylate polymers, trifunctional polyester acrylate polymers, tetrafunctional polyester acrylate polymers, monofunctional (meth)acrylate ester monomers, bifunctional (meth)acrylate ester monomers, trifunctional (meth)acrylate ester monomers, tetrafunctional (meth)acrylate ester monomers, pentafunctional (meth)acrylate ester monomers, hexafunctional (meth)acrylate ester monomers, monofunctional (meth)acrylate ester oligomers, bifunctional (meth)acrylate ester oligomers, trifunctional (meth)acrylate ester oligomers, tetrafunctional (meth)acrylate ester oligomers, pentafunctional (meth)acrylate ester oligomers, hexafunctional (meth)acrylate ester oligomers, monofunctional (meth)acrylate ester polymers, bifunctional (meth)acrylate ester polymers, trifunctional (meth)acrylate ester polymers, tetrafunctional (meth)acrylate ester polymers, pentafunctional (meth)acrylate ester polymers and hexafunctional (meth)acrylate ester polymers, wherein a content of the monofunctional (meth)acrylate ester monomers, the monofunctional (meth)acrylate ester oligomers or the monofunctional (meth)acrylate ester polymers based on the total amount of the liquid crystal composition is 10 to 40 mass %, wherein a content of the at least one of the some of the polymerizable organic compounds selected from the group consisting of the bifunctional (meth)acrylate ester monomers, the bifunctional (meth)acrylate ester oligomers, the bifunctional (meth)acrylate ester polymers, the bifunctional aliphatic urethane acrylate monomers, the bifunctional aliphatic urethane acrylate oligomers, the bifunctional aliphatic urethane acrylate polymers, the bifunctional aliphatic oligomer acrylate monomers, the bifunctional aliphatic oligomer acrylate oligomers, the bifunctional aliphatic oligomer acrylate polymers, the bifunctional polyester acrylate monomers, the bifunctional polyester acrylate oligomers and the bifunctional polyester acrylate polymers based on the total amount of the liquid crystal composition is 1 to 30 mass %, wherein a content of the bifunctional thiol monomers, the trifunctional thiol monomers, the tetrafunctional thiol monomers, the bifunctional thiol oligomers, the trifunctional thiol oligomers, the tetrafunctional thiol oligomers, the bifunctional thiol polymers, the trifunctional thiol polymers, or the tetrafunctional thiol polymers based on the total amount of the liquid crystal composition is 1 to 10 mass %, wherein a content of the monofunctional phosphate (meth)acrylate monomers, the monofunctional phosphate (meth)acrylate oligomers or the monofunctional phosphate (meth)acrylate polymers based on the total amount of the liquid crystal composition is 0.1 to 3 mass %, and wherein a content of at least one of the some of the polymerizable organic compounds selected from the group consisting of the trifunctional aliphatic urethane acrylate monomers, the tetrafunctional aliphatic urethane acrylate monomers, the trifunctional aliphatic urethane acrylate oligomers, the tetrafunctional aliphatic urethane acrylate oligomers, the trifunctional aliphatic urethane acrylate polymers, the tetrafunctional aliphatic urethane acrylate polymers, the trifunctional polyester acrylate monomers, the tetrafunctional polyester acrylate monomers, the trifunctional polyester acrylate oligomers, the tetrafunctional polyester acrylate oligomers, the trifunctional polyester acrylate polymers, the tetrafunctional polyester acrylate polymers, the trifunctional (meth)acrylate ester monomers, the tetrafunctional (meth)acrylate ester monomers, the pentafunctional (meth)acrylate ester monomers, hexafunctional (meth)acrylate ester monomers, the trifunctional (meth)acrylate ester oligomers, the tetrafunctional (meth)acrylate ester oligomers, the pentafunctional (meth)acrylate ester oligomers, the hexafunctional (meth)acrylate ester oligomers, the trifunctional (meth)acrylate ester polymers, the tetrafunctional (meth)acrylate ester polymers, the pentafunctional (meth)acrylate ester polymers, and the hexafunctional (meth)acrylate ester polymers based on the total amount of the liquid crystal composition is 1 to 20 mass %.

5. A liquid crystal element comprising:
a planar first base material;
a first conductive film that is disposed on one side of the first base material and has conductivity;
a liquid crystal layer that is disposed on the side of the first conductive film opposite to the first base material and contains a liquid crystal composition;
a second conductive film that is disposed on the side of the liquid crystal layer opposite to the first conductive film and has conductivity; and
a planar second base material that is disposed on the side of the second conductive film opposite to the liquid crystal layer,
wherein the liquid crystal composition contains polymerizable organic compounds and a liquid crystal compound,
wherein the liquid crystal compound has a solid phase-nematic phase transition temperature or smectic phase-nematic phase transition temperature of 0° C. or lower,
wherein some of the polymerizable organic compounds have a glass transition temperature of 0° C. or lower, and a content of the some of the polymerizable organic compounds having a glass transition temperature of 0° C. or lower based on a total amount of the liquid crystal composition is 10 to 60 mass %, and
wherein the some of the polymerizable organic compounds having a glass transition temperature of 0° C. or lower comprise at least one selected from the group consisting of bifunctional aliphatic urethane acrylate monomers, trifunctional aliphatic urethane acrylate monomers, tetrafunctional aliphatic urethane acrylate monomers, bifunctional aliphatic urethane acrylate oligomers, trifunctional aliphatic urethane acrylate oligomers, tetrafunctional aliphatic urethane acrylate oligomers, bifunctional aliphatic urethane acrylate polymers, trifunctional aliphatic urethane acrylate polymers, tetrafunctional aliphatic urethane acrylate polymers, bifunctional thiol monomers, trifunctional thiol monomers, tetrafunctional thiol monomers, bifunctional thiol oligomers, trifunctional thiol oligomers, tetrafunctional thiol oligomers, bifunctional thiol polymers, trifunctional thiol polymers, tetrafunctional thiol polymers, monofunctional phosphate (meth)acrylate monomers, monofunctional phosphate (meth)acrylate oligomers and monofunctional phosphate (meth) acrylate polymers, and at least one selected from the group consisting of bifunctional aliphatic oligomer acrylate monomers, trifunctional aliphatic oligomer acrylate monomers, tetrafunctional aliphatic oligomer acrylate monomers, bifunctional aliphatic oligomer acrylate oligomers, trifunctional aliphatic oligomer acrylate oligomers, tetrafunctional aliphatic oligomer acrylate oligomers, bifunctional aliphatic oligomer acrylate polymers, trifunctional aliphatic oligomer acrylate polymers, tetrafunctional aliphatic oligomer acrylate polymers, bifunctional polyester acrylate monomers, trifunctional polyester acrylate monomers, tetrafunctional polyester acrylate monomers, bifunctional polyester acrylate oligomers, trifunctional polyester acrylate oligomers, tetrafunctional polyester acrylate oligomers, bifunctional polyester acrylate polymers, trifunctional polyester acrylate polymers, tetrafunctional polyester acrylate polymers, monofunctional (meth)acrylate ester monomers, bifunctional (meth)acrylate ester monomers, trifunctional (meth)acrylate ester monomers, tetrafunctional (meth)acrylate ester monomers, pentafunctional (meth)acrylate ester monomers, hexafunctional (meth) acrylate ester monomers, monofunctional (meth)acrylate ester oligomers, bifunctional (meth)acrylate ester oligomers, trifunctional (meth)acrylate ester oligomers, tetrafunctional (meth)acrylate ester oligomers, pentafunctional (meth)acrylate ester oligomers, hexafunctional (meth)acrylate ester oligomers, monofunctional (meth)acrylate ester polymers, bifunctional (meth) acrylate ester polymers, trifunctional (meth)acrylate ester polymers, tetrafunctional (meth)acrylate ester polymers, pentafunctional (meth)acrylate ester polymers and hexafunctional (meth)acrylate ester polymers, wherein a content of the monofunctional (meth)acrylate ester monomers, the monofunctional (meth)acrylate ester oligomers or the monofunctional (meth)acrylate ester polymers based on the total amount of the liquid crystal composition is 10 to 40 mass %, wherein a content of the at least one of the some of the polymerizable organic compounds selected from the group consisting of the bifunctional (meth)acrylate ester monomers, the bifunctional (meth)acrylate ester oligomers, the bifunctional (meth)acrylate ester polymers, the bifunctional aliphatic urethane acrylate monomers, the bifunctional aliphatic urethane acrylate oligomers, the bifunctional aliphatic urethane acrylate polymers, the bifunctional aliphatic oligomer acrylate monomers, the bifunctional aliphatic oligomer acrylate oligomers, the bifunctional aliphatic oligomer acrylate polymers, the bifunctional polyester acrylate monomers, the bifunctional polyester acrylate oligomers and the bifunctional polyester acrylate polymers based on the total amount of the liquid crystal composition is 1 to 30 mass %, wherein a content of the bifunctional thiol monomers, the trifunctional thiol monomers, the tetrafunctional thiol monomers, the bifunctional thiol oligomers, the trifunctional thiol oligomers, the tetrafunctional thiol oligomers, the bifunctional thiol polymers, the trifunctional thiol polymers, or the tetrafunctional thiol polymers based on the total amount of the liquid crystal composition is 1 to 10 mass %, wherein a content of the monofunctional phosphate (meth)acrylate monomers, the monofunctional phosphate (meth)acrylate oligomers or the monofunctional phosphate (meth)acrylate polymers based on the total amount of the liquid crystal composition is 0.1 to 3 mass %, and wherein a content of at least one of the some of the polymerizable organic compounds selected from the group consisting of the trifunctional aliphatic urethane acrylate monomers, the tetrafunctional aliphatic urethane acrylate monomers, the trifunctional aliphatic urethane acrylate oligomers, the tetrafunctional aliphatic urethane acrylate oligomers, the trifunctional aliphatic urethane acrylate polymers, the tetrafunctional aliphatic urethane acrylate polymers, the trifunctional polyester acrylate monomers, the tetrafunctional polyester acrylate monomers, the trifunctional polyester acrylate oligomers, the tetrafunctional polyester acrylate oligomers, the trifunctional polyester acrylate polymers, the tetrafunctional polyester acrylate polymers, the trifunctional (meth)acrylate ester monomers, the tetrafunctional (meth)acrylate ester monomers, the pentafunctional (meth)acrylate ester monomers, hexafunctional (meth)acrylate ester monomers, the trifunctional (meth)acrylate ester oligomers, the tetrafunctional (meth)acrylate ester oligomers, the pentafunctional (meth)acrylate ester oligomers, the hexafunctional (meth)acrylate ester oligomers, the trifunctional (meth)acrylate ester polymers, the tetrafunctional (meth)acrylate ester polymers, the pentafunctional (meth)acrylate ester polymers, and the hexafunctional (meth)acrylate ester polymers based on the total amount of the liquid crystal composition is 1 to 20 mass %.

* * * * *